(12) United States Patent
Sun et al.

(10) Patent No.: US 11,647,539 B2
(45) Date of Patent: May 9, 2023

(54) RECEIVER SIDE ENHANCED CLEAR CHANNEL ASSESSMENT FOR UNLICENSED BAND

(71) Applicant: QUALCOMM Incorporated, San Diego, CA (US)

(72) Inventors: Jing Sun, San Diego, CA (US); Vinay Chande, San Diego, CA (US); Arumugam Chendamarai Kannan, San Diego, CA (US); Srinivas Yerramalli, Hyderabad (IN); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 17/170,232

(22) Filed: Feb. 8, 2021

(65) Prior Publication Data

US 2021/0251000 A1    Aug. 12, 2021

Related U.S. Application Data

(60) Provisional application No. 62/972,614, filed on Feb. 10, 2020.

(51) Int. Cl.
*H04W 74/08* (2009.01)
(52) U.S. Cl.
CPC .............................. *H04W 74/0808* (2013.01)
(58) Field of Classification Search
CPC ........... H04W 74/0808; H04W 74/008; H04W 92/18
See application file for complete search history.

(56) References Cited

U.S. PATENT DOCUMENTS 10,841,950 B2 * 11/2020 Sun ................... H04W 74/0808
10,841,953 B2 * 11/2020 Sun ....................... H04L 5/0044
(Continued)

OTHER PUBLICATIONS

AT&T: "Closed Loop LBT for License Assisted NR in Unlicensed Bands", 3GPP TSG RAN WG1 Meeting 92bis, 3GPP Draft; R1-1804665 Closed Loop LBT for License Assisted NR-U, 3rd Generation Partnership Project (3GPP), Mobile Competence Centre; 650, Route Des Lucioles; F-06921 Sophia-Antipolis Cedex; Franc, vol. RAN WG1, No. Sanya, China; Apr. 16, 2018-Apr. 20, 2018, Apr. 7, 2018 (Apr. 7, 2018), 5 Pages, XP051414037, Retrieved from the Internet: URL: http://www.3gpp.org/ftp/tsg%5Fran/WG1% 5FRL1/TSGR1%5F92b/Docs/ [retrieved on Apr. 7, 2018] section 2.3; p. 2-p. 4; figure 2.

(Continued)

*Primary Examiner* — Ahmed Elallam
(74) *Attorney, Agent, or Firm* — Holland & Hart LLP/Qualcomm Incorporated

(57) ABSTRACT

Methods, systems, and devices for wireless communications are described. A first wireless device may receive a clear channel assessment trigger from a second wireless device, the clear channel assessment trigger associated with a data transmission by the second wireless device. The first wireless device may transmit, based at least in part on a result of a first clear channel assessment procedure, feedback information for the clear channel assessment trigger. The first wireless device may receive the data transmission based at least in part on the feedback information for the first clear channel assessment procedure. The first wireless device may transmit, based at least in part on a result of a second clear channel assessment procedure, feedback information for the data transmission, wherein the first clear channel assessment procedure has a first duration that is longer than a second duration for the second clear channel assessment procedure.

30 Claims, 14 Drawing Sheets

(56) References Cited

U.S. PATENT DOCUMENTS

| | | | |
|---|---|---|---|
| 11,140,558 B2* | 10/2021 | Chendamarai Kannan | ................. H04L 5/0044 |
| 11,224,074 B2* | 1/2022 | Basu Mallick | ... H04W 74/0808 |
| 11,265,830 B2* | 3/2022 | Park | .................... H04W 56/001 |
| 2016/0338104 A1* | 11/2016 | Yin | .................... H04W 74/0816 |
| 2017/0374679 A1* | 12/2017 | Park | .................... H04W 74/004 |
| 2019/0261412 A1 | 8/2019 | Novlan et al. | |
| 2019/0357255 A1 | 11/2019 | Sun et al. | |

OTHER PUBLICATIONS

International Search Report and Written Opinion—PCT/US2021/017277—ISA/EPO—dated May 25, 2021.

LG Electronics: "Channel Access Procedure for NR Unlicensed Operation", 3GPP TSG RAN WG1 Meeting #93, 3GPP Draft; R1-1806645, 3rd Generation Partnership Project (3GPP), Mobile Competence Centre, 650, Route Des Lucioles, F-06921 Sophia-Antipolis Cedex, France, vol. RAN WG1, No. Busan, Korea; May 21, 2018-May 25, 2018, May 12, 2018, 6 pages, XP051462685, Retrieved from the Internet: URL: http://www.3gpp.org/ftp/tsg%5Fran/WG1%5FRL1/TSGR1%5F93/Docs [retrieved on May 12, 2018] section 2.3, p. 3-p. 5; figure 2.

\* cited by examiner

RECEIVER SIDE ENHANCED CLEAR CHANNEL ASSESSMENT FOR UNLICENSED BAND

CROSS REFERENCE

The present application for patent claims the benefit of U.S. Provisional Patent Application No. 62/972,614 by SUN et al., entitled "RECEIVER SIDE ENHANCED CLEAR CHANNEL ASSESSMENT FOR UNLICENSED BAND," filed Feb. 10, 2020, assigned to the assignee hereof, and expressly incorporated by reference herein.

FIELD OF TECHNOLOGY

The following relates generally to wireless communications and more specifically to receiver side enhanced clear channel assessment (eCCA) for unlicensed band.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support receiver side enhanced clear channel assessment (eCCA) for unlicensed band. Generally, the described techniques provide for a receiver side long clear channel assessment (CCA) procedure, such as an eCCA procedure, while allowing for a short CCA procedure (e.g., a one-shot or category-2 listen-before-talk (LBT) procedure) before control signaling transmissions. For example and in the downlink, a base station (e.g., a second wireless device in this example) may perform a short CCA procedure before transmitting a CCA trigger to a user equipment (UE) (e.g., a first wireless device in this example). The CCA trigger may schedule a downlink transmission for the UE and/or may schedule the UE to transmit a feedback signal (e.g., acknowledgment/negative-acknowledgment (ACK/NACK), or more simply A/N, transmission) for the CCA trigger. The UE may receive the CCA trigger from the base station and perform a long CCA procedure (e.g., an eCCA procedure) before transmitting feedback information for the CCA trigger (e.g., the A/N feedback information for the CCA trigger). The base station may receive the feedback information for the CCA trigger and then perform another short CCA procedure before transmitting the downlink transmission (e.g., data transmission) to the UE. The UE may then perform a short CCA procedure (e.g., a one-shot LBT procedure) before transmitting feedback information for the downlink transmission (e.g., the A/N feedback information for the data transmission). As another example in the uplink, the base station may perform a long CCA procedure (e.g., an eCCA procedure) before transmitting an uplink grant to the UE. The UE may receive the uplink grant and perform a short CCA procedure (e.g., a one-shot LBT procedure) before transmitting the uplink transmission (e.g., an uplink data transmission) to the base station.

In some aspects, one or more of the short CCA procedures implemented at the base station and/or UE may be optional. For example, if the gap between receiving one transmission and performing a transmission is below a threshold (e.g., satisfies the threshold) in the time domain (e.g., less than X microseconds), the short CCA procedure may be omitted. In some aspects, this may include gaps between control signaling transmissions being allowed with a short CCA prior to a receiver side eCCA procedure being performed. After the receiver side eCCA procedure is performed, gaps between transmission bursts may be allowed with a short CCA if the gap is longer than X microseconds, e.g., gaps between transmission bursts may be allowed without the short CCA if the gap is no longer than X microseconds. In this context, a gap may refer to an interval of time where neither devices are either transmitting or receiving. The duration of these gaps may be a component in determining whether a short CCA is performed before transmission, e.g., dependent upon whether the receiver side eCCA procedure has been performed yet.

A method of wireless communication is described. The method may include receiving, at a first wireless device, a CCA trigger from a second wireless device, the CCA trigger associated with a data transmission by the second wireless device, transmitting, based on a result of a first CCA procedure, feedback information for the CCA trigger, receiving the data transmission based on the feedback information for the first CCA procedure, and transmitting, based on a result of a second CCA procedure, feedback information for the data transmission, where the first CCA procedure has a first duration that is longer than a second duration for the second CCA procedure.

An apparatus for wireless communication is described. The apparatus may include a processor, memory coupled with the processor, and instructions stored in the memory. The instructions may be executable by the processor to cause the apparatus to receive, at a first wireless device, a CCA trigger from a second wireless device, the CCA trigger associated with a data transmission by the second wireless device, transmit, based on a result of a first CCA procedure, feedback information for the CCA trigger, receive the data transmission based on the feedback information for the first CCA procedure, and transmit, based on a result of a second CCA procedure, feedback information for the data transmission, where the first CCA procedure has a first duration that is longer than a second duration for the second CCA procedure.

Another apparatus for wireless communication is described. The apparatus may include means for receiving, at a first wireless device, a CCA trigger from a second wireless device, the CCA trigger associated with a data transmission by the second wireless device, transmitting, based on a result of a first CCA procedure, feedback information for the CCA trigger, receiving the data transmission based on the feedback information for the first CCA procedure, and transmitting, based on a result of a second CCA procedure, feedback information for the data transmission, where the first CCA procedure has a first duration that is longer than a second duration for the second CCA procedure.

A non-transitory computer-readable medium storing code for wireless communication is described. The code may include instructions executable by a processor to receive, at a first wireless device, a CCA trigger from a second wireless device, the CCA trigger associated with a data transmission by the second wireless device, transmit, based on a result of a first CCA procedure, feedback information for the CCA trigger, receive the data transmission based on the feedback information for the first CCA procedure, and transmit, based on a result of a second CCA procedure, feedback information for the data transmission, where the first CCA procedure has a first duration that is longer than a second duration for the second CCA procedure.

In some examples of the method, apparatuses, and non-transitory computer-readable medium described herein, transmitting, based on the result of the first CCA procedure, feedback information for the CCA trigger may include operations, features, means, or instructions for transmitting the feedback information if the first CCA procedure may be successful.

Some examples of the method, apparatuses, and non-transitory computer-readable medium described herein may further include operations, features, means, or instructions for determining that the first wireless device may have data for transmission to the second wireless device, and multiplexing the data and the feedback information for the first CCA trigger in a same transmission burst to the second wireless device.

Some examples of the method, apparatuses, and non-transitory computer-readable medium described herein may further include operations, features, means, or instructions for determining, based on the CCA trigger, a channel occupancy time for the data transmission.

Some examples of the method, apparatuses, and non-transitory computer-readable medium described herein may further include operations, features, means, or instructions for determining, based on the CCA trigger, a gap duration between receiving the data transmission and transmitting the feedback information for the data transmission, and selecting the second duration for the second CCA procedure based on the gap duration.

Some examples of the method, apparatuses, and non-transitory computer-readable medium described herein may further include operations, features, means, or instructions for determining the first duration for the first CCA procedure based on the CCA trigger.

Some examples of the method, apparatuses, and non-transitory computer-readable medium described herein may further include operations, features, means, or instructions for receiving a resource allocation for transmitting the feedback information for the CCA trigger, and determining the first duration of the first CCA procedure based on the resource allocation for transmitting the feedback information for the CCA trigger.

Some examples of the method, apparatuses, and non-transitory computer-readable medium described herein may further include operations, features, means, or instructions for determining that a gap period between receiving the data transmission and transmitting the feedback information for the data transmission satisfies a threshold, where the second channel assessment procedure may be performed based on the gap period satisfying the threshold.

A method of wireless communication is described. The method may include transmitting, based on a result of a first CCA procedure, a CCA trigger to a first wireless device, the CCA trigger associated with a data transmission by a second wireless device, receiving, from the first wireless device, feedback information for the CCA trigger, transmitting, based on a result of a second CCA procedure and responsive to the feedback information for the CCA trigger, the data transmission to the first wireless device, and receiving feedback information for the data transmission from the first wireless device.

An apparatus for wireless communication is described. The apparatus may include a processor, memory coupled with the processor, and instructions stored in the memory. The instructions may be executable by the processor to cause the apparatus to transmit, based on a result of a first CCA procedure, a CCA trigger to a first wireless device, the CCA trigger associated with a data transmission by a second wireless device, receive, from the first wireless device, feedback information for the CCA trigger, transmit, based on a result of a second CCA procedure and responsive to the feedback information for the CCA trigger, the data transmission to the first wireless device, and receive feedback information for the data transmission from the first wireless device.

Another apparatus for wireless communication is described. The apparatus may include means for transmitting, based on a result of a first CCA procedure, a CCA trigger to a first wireless device, the CCA trigger associated with a data transmission by a second wireless device, receiving, from the first wireless device, feedback information for the CCA trigger, transmitting, based on a result of a second CCA procedure and responsive to the feedback information for the CCA trigger, the data transmission to the first wireless device, and receiving feedback information for the data transmission from the first wireless device.

A non-transitory computer-readable medium storing code for wireless communication is described. The code may include instructions executable by a processor to transmit, based on a result of a first CCA procedure, a CCA trigger to a first wireless device, the CCA trigger associated with a data transmission by a second wireless device, receive, from the first wireless device, feedback information for the CCA trigger, transmit, based on a result of a second CCA procedure and responsive to the feedback information for the CCA trigger, the data transmission to the first wireless device, and receive feedback information for the data transmission from the first wireless device.

In some examples of the method, apparatuses, and non-transitory computer-readable medium described herein, transmitting the CCA trigger may include operations, features, means, or instructions for transmitting the CCA trigger to trigger the data transmission to the first wireless device if the first CCA procedure may be successful.

Some examples of the method, apparatuses, and non-transitory computer-readable medium described herein may further include operations, features, means, or instructions for determining that the first wireless device may have data for transmission to the second wireless device, and receiving the data multiplexed with the feedback information for the first CCA trigger in a same transmission burst from the first wireless device.

Some examples of the method, apparatuses, and non-transitory computer-readable medium described herein may further include operations, features, means, or instructions for selecting, based on the data, a first duration for the first CCA procedure, where the first duration may be longer than a second duration for the second CCA procedure.

Some examples of the method, apparatuses, and non-transitory computer-readable medium described herein may further include operations, features, means, or instructions for determining, based on the first CCA procedure, a channel occupancy time for the data transmission.

Some examples of the method, apparatuses, and non-transitory computer-readable medium described herein may further include operations, features, means, or instructions for identifying a duration for a third CCA procedure for the first wireless device to perform before transmitting the feedback information for the CCA trigger, selecting a resource allocation for the first wireless device to use to transmit the feedback information for the CCA trigger based on the duration for the third CCA procedure, and transmitting the resource allocation to the first wireless device.

Some examples of the method, apparatuses, and non-transitory computer-readable medium described herein may further include operations, features, means, or instructions for determining that an interference level for a channel used for communicating with the first wireless device may have a threshold rate of change, where the second CCA procedure may be performed based on the threshold rate of change.

Some examples of the method, apparatuses, and non-transitory computer-readable medium described herein may further include operations, features, means, or instructions for determining that a gap period between receiving the feedback information for the CCA trigger and transmitting the data transmission satisfies a threshold, where the second CCA procedure may be performed based on the gap period satisfying the threshold.

DETAILED DESCRIPTION

Figure 1:
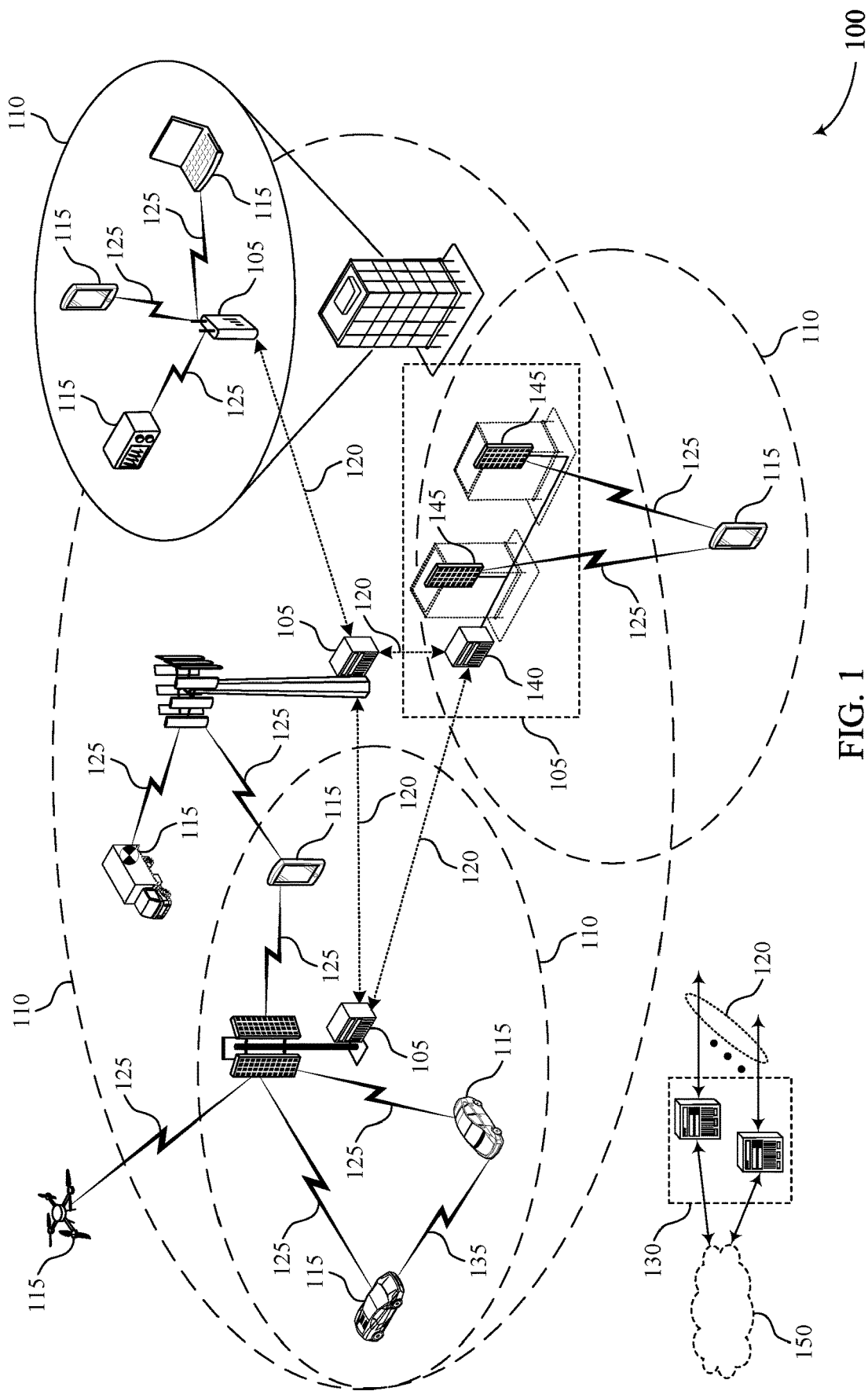
FIG. 1 illustrates an example of a system for wireless communications that supports receiver side enhanced clear channel assessment (eCCA) for unlicensed band in accordance with aspects of the present disclosure.

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the user equipment (UE) may be beamformed. Moreover, a receiving device may use beamforming techniques to configure antenna(s) and/or antenna array(s) such that transmissions are received in a directional manner.

For a mmW link, the transmitting device and a receiving device may experience very different interference/channel performance environments. Accordingly, some wireless communication systems are configured such that the receiving device (e.g., a UE) is afforded more protection than the transmitting device (e.g., a base station). In some aspects, affording the receiving device more protection may include the receiving device implementing a channel clearance procedure (e.g., such as an enhanced clear channel assessment (eCCA) procedure) prior to transmitting an acknowledgment feedback transmission (e.g., feedback information) to the base station. Focusing the channel clearance procedure design (e.g., the listen-before-talk (LBT) design) can avoid unnecessary backoffs at the base station while still protecting the receiving device. In some designs, the duration or length of the channel clearance procedure (e.g., the eCCA procedure) may be explicitly indicated to the UE by the base station.

Aspects of the disclosure are initially described in the context of wireless communication systems. Generally, the described techniques provide for a receiver side long clear channel assessment (CCA) procedure, such as an eCCA procedure, while allowing for a short CCA procedure (e.g., a one-shot or category-2 LBT procedure) before control signaling transmissions. For example and in the downlink, a base station (e.g., a second wireless device in this example) may perform a short CCA procedure before transmitting a CCA trigger to a UE (e.g., a first wireless device in this example). The CCA trigger may schedule a downlink transmission for the UE and/or may schedule the UE to transmit a feedback signal (e.g., acknowledgment/negative-acknowledgment (ACK/NACK), or more simply A/N, transmission) for the CCA trigger. The UE may receive the CCA trigger from the base station and perform a long CCA procedure (e.g., an eCCA procedure) before transmitting feedback information for the CCA trigger (e.g., the A/N feedback information for the CCA trigger). The base station may receive the feedback information for the CCA trigger and then perform another short CCA procedure before transmitting the downlink transmission (e.g., data transmission) to the UE. The UE may then perform a short CCA procedure (e.g., a one-shot LBT procedure) before transmitting feedback information for the downlink transmission (e.g., the A/N feedback information for the data transmission). As another example and in the uplink, the base station may perform a long CCA procedure (e.g., a eCCA procedure) before transmitting an uplink grant to the UE. The UE may receive the uplink grant and perform a short CCA procedure (e.g., a one-shot LBT procedure) before transmitting the uplink transmission (e.g., an uplink data transmission) to the base station.

In some aspects, one or more of the short CCA procedures implemented at the base station and/or UE may be optional. For example, if the gap between receiving one transmission and performing a transmission is below a threshold (e.g., satisfies the threshold) in the time domain (e.g., less than X microseconds), the short CCA procedure may be omitted. In some aspects, this may include gaps between control signaling transmissions being allowed with a short CCA prior to a receiver side eCCA procedure being performed. After the receiver side eCCA procedure is performed, gaps between transmission bursts may be allowed with a short CCA if the gap is longer than X microseconds, e.g., gaps between transmission bursts may be allowed without the short CCA if the gap is no longer than X microseconds. In this context, a gap may refer to an interval of time where neither devices are either transmitting or receiving. The duration of these gaps may be a component in determining whether a short CCA is performed before transmission, e.g., dependent upon whether the receiver side eCCA procedure has been performed yet.

Aspects of the disclosure are further illustrated by and described with reference to apparatus diagrams, system diagrams, and flowcharts that relate to receiver side eCCA for unlicensed band.

FIG. 1 illustrates an example of a wireless communication system 100 that supports receiver side eCCA for unlicensed band in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first wireless device (e.g., a UE 115 and/or base station 105 receiving a data transmission) may receive, at the first wireless device, a CCA trigger from a second wireless device, the CCA trigger associated with a data transmission by the second wireless device. The first wireless device may transmit, based at least in part on a result of a first CCA procedure, feedback information for the CCA trigger. The first wireless device may receive the data transmission based at least in part on the feedback information for the first CCA procedure. The first wireless device may transmit, based at least in part on a result of a second CCA procedure, feedback information for the data transmission, wherein the first CCA procedure has a first duration that is longer than a second duration for the second CCA procedure.

A second wireless device (e.g., a UE 115 and/or base station 105 transmitting the data transmission) may transmit, based at least in part on a result of a first CCA procedure, a CCA trigger to a first wireless device, the CCA trigger associated with a data transmission by a second wireless device. The second wireless device may receive, from the first wireless device, feedback information for the CCA trigger. The second wireless device may transmit, based at least in part on a result of a second CCA procedure and responsive to the feedback information for the CCA trigger, the data transmission to the first wireless device. The second wireless device may receive feedback information for the data transmission from the first wireless device.

Figure 2:
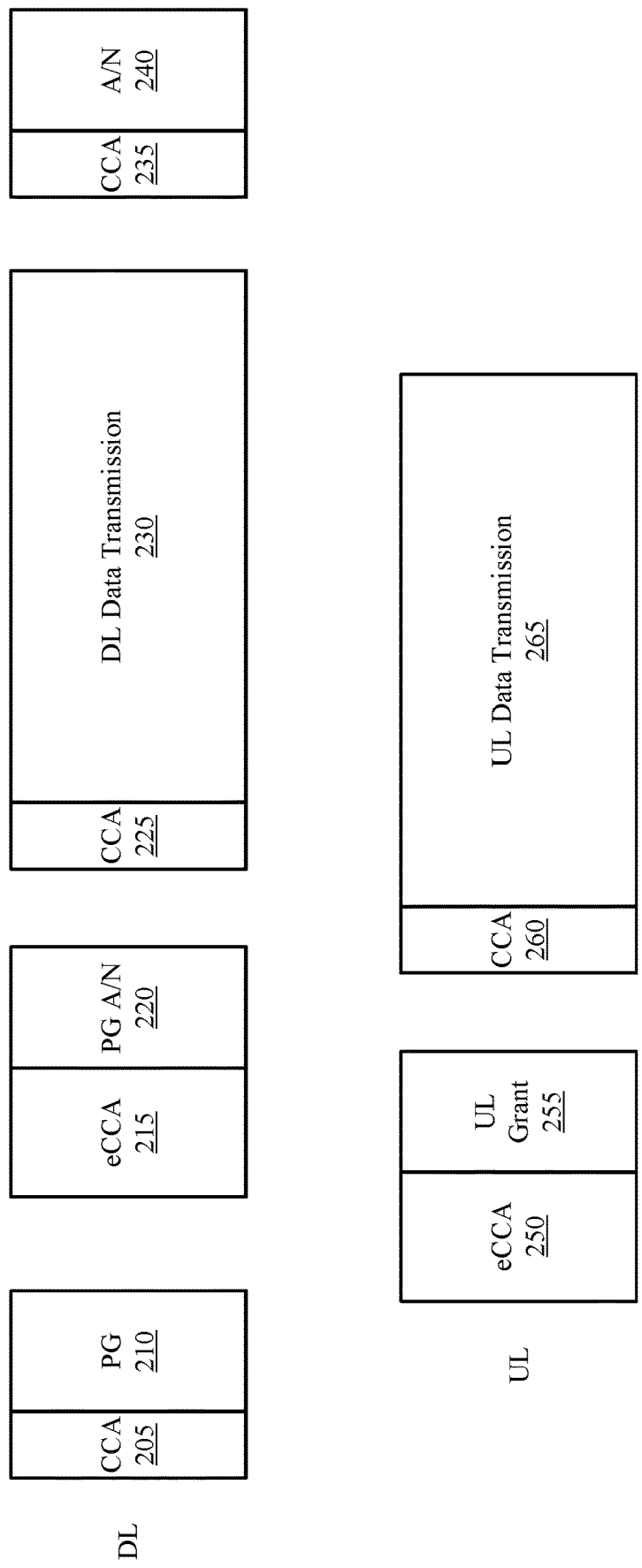
FIG. 2 illustrates an example of a channel occupancy time (CoT) configuration that supports receiver side eCCA for unlicensed band in accordance with aspects of the present disclosure.

FIG. 2 illustrates an example of a CoT configuration 200 that supports receiver side eCCA for unlicensed band in accordance with aspects of the present disclosure. In some examples, CoT configuration 200 may implement aspects of wireless communication system 100. CoT configuration 200 may be implemented by a UE and/or base station, which may be examples of the corresponding devices described herein. Generally, CoT configuration 200 illustrates example CoT configurations for both downlink (DL) and uplink (UL) communications.

In energy detection-based LBT, the listening/sensing procedure (e.g., eCCA procedure) is typically performed by the transmitting device before occupying the medium. If the medium is determined to be unavailable (e.g., is found busy), the transmitter is silent (e.g., performs a backoff procedure and waits to perform its transmission). This is meant to protect an ongoing transmission at the expense of delaying the contending node's transmission. For a mmW link, the base station (e.g., transmitting device in this example) and UE (e.g., receiving device in this example) may experience very different interference/channel performance environments. For example, the receiving device may be jammed (e.g., have high energy detection on the channel) while the transmitting device may not be. Due to this mismatch, transmitter side eCCA may not be useful. Although the UE is generally described as the receiving device in the downlink example, it is to be understood that the base station may be the receiving device in an uplink example.

Accordingly, some wireless communication systems are configured such that the receiving device (e.g., a first wireless device, or UE in this downlink example) is afforded more protection than the transmitting device (e.g., the base station). In some aspects, affording the receiving device more protection may include the receiving device implementing a channel clearance procedure (e.g., such as an eCCA procedure) prior to transmitting feedback information to the base station. Focusing the CCA procedure design (e.g., the LBT design) at the receiving device can avoid unnecessary backoffs at the base station, while still protecting the receiving device.

In some aspects, this form of LBT design (e.g., receiver side eCCA) is not just focused on contention resolution. Instead, the LBT may be for current link validation. That is, the transmitting device can still transmit, but the transmission only happens if there is a benefit to the receiver (e.g., if the receiver is able to receive the transmission). In other words, if the receiver cannot receive the signal due to a jamming device nearby, the transmitting device will not transmit the long data burst. In this way, though a transmission jamming a victim receiver is not silenced, the cases are avoided where the jamming happened (i.e., the damage is done), that the target receiver cannot properly receive the signal.

Accordingly, aspects of the described technique apply the eCCA procedure (e.g., the CAT-4 CCA or LBT procedure) at the receiver side before a data transmission, while allowing short control signaling (e.g., grant(s), A/N feedback information, etc.) with or without a short CCA procedure (e.g., a one-shot LBT/CAT-2 LBT) before eCCA. The short control signaling and the gaps in between may count towards the maximum CoT allowed. Before the eCCA procedure, the gaps between control signaling may be allowed with the CCA. After the eCCA procedure, gaps between bursts may be allowed with the CCA if the gap does extend longer than X microseconds, and gaps between bursts allowed without the CCA if the gap is no longer than X microseconds (e.g., X may be equal to 3 µs in one non-limiting example). The presence or absence of the short CCA procedures changes the requirements on the timing constraints for the communications.

For example and beginning with the downlink example, the base station (the transmitting device, which may be referred to as a second wireless device in this example) may perform a CCA procedure 205 (e.g., a one-shot LBT procedure, CAT-2 LBT procedure, and the like) prior to transmitting a grant 210 (e.g., a pre-grant (PG) to the UE, which may be a PDCCH DCI grant acting as a CCA trigger). The grant 210 may schedule a feedback information transmission 220 and data transmission 230 for the UE (the receiving device, which may be referred to as the first wireless device in this example). In some aspects, the grant 210 may indicate to the UE that a downlink burst (e.g., data transmission 230) is coming, e.g., the grant 210 may serve as an eCCA trigger for the UE and may include the eCCA link parameter n indicating the duration of the eCCA procedure 215. The grant 210 may be sent after the base station performs the CCA procedure 205 (e.g., the short or one-shot/CAT-2 LBT/CCA procedure).

Accordingly, the UE may perform an eCCA procedure 215 (e.g., a full or CAT-4 LBT procedure) prior to transmitting the feedback information transmission 220 to the base station. That is, if the eCCA procedure 215 a successful, the UE may transmit the feedback information transmission 220 to the base station. The feedback information transmission 220 may also be considered uplink control signaling that triggers the base station to transmit the actual downlink burst. The length or duration of the eCCA procedure 215 implemented at the receiving device may be indicated by the base station in the grant 210, e.g., using the eCCA length parameter n. In some aspects, the feedback information transmission 220 may be an ACK/NACK feedback transmission for the grant 210, e.g., confirming that the UE was able to receive and decode the grant 210.

Based on receiving the feedback information transmission 220, the base station may perform a CCA procedure 225 (e.g., a one-shot LBT procedure) prior to performing the data transmission 230 to the UE. That is, the downlink burst may be sent after performing the CCA procedure 225 at the base station. Subsequently, the UE may perform a CCA procedure 235 (e.g., a one-shot LBT procedure) prior to performing a second feedback information transmission 240 indicating whether the UE was able to successfully receive and decode the data transmission 230.

In some aspects, various options may be implemented for the downlink transmission scenario discussed above. In one aspect, a gap period between bursts may not need to be accurately controlled, e.g., there is no requirement to abandon a CoT when a gap period is larger than X microseconds within the CoT.

In one option with respect to CCA procedure 205, the base station may use the CCA procedure 205 to initiate the CoT, e.g., to send the downlink pre-grant (grant 210). CCA procedure 205 may increase the chance of finding a clear channel for the base station to receive the feedback information transmission 220 and/or the second feedback information transmission 240. If the CCA procedure 205 fails, the base station cannot listen in that direction (e.g., may not communicate with a UE located in that direction), it may indicate that is not worth trying to perform the downlink transmission to the UE at that time. In another option with respect to CCA procedure 205, the base station may not perform the CCA procedure 205, e.g., the wireless communication system may be configured such that control signaling (e.g., grant 210) can be performed without the CCA procedure 205 being performed.

In one option with respect to CCA procedure 225, this may support the downlink burst (e.g., data transmission 230) occurring within the CoT, but the data transmission 230 can start with or without the CCA procedure 225. In one option, the CCA procedure 225 may not be performed (e.g., may be skipped). For example, the base station could transmit the data transmission 230 without performing the CCA procedure 225 assuming the interference does not change too fast. For example, the base station could determine that an interference level for the channel has a threshold rate of change (e.g., does not change too fast). Accordingly, the CCA procedure 225 may be performed based on the threshold rate of change for the interference level for the channel. In another option with respect to CCA procedure 225, the data transmission 230 may start after the CCA procedure 225 is performed. For example, it may be safer to use CCA procedure 225 to address the cases where the interference changes. In previous configurations, it was considered that the CCA procedure 225 can be omitted when the gap between the feedback information transmission 220 and the data transmission 230 was below a threshold (e.g., less than X microseconds) since this would prevent other nodes from stepping on the data transmission 230. However, that may be inapplicable for a mmW link, e.g., directionality may prevent the other nodes from detecting previous bursts.

Turning now to the example uplink scenario, the base station may be considered the receiving device and the UE may be considered the transmitting device in this scenario. Aspects of the described techniques may include the base station performing eCCA procedure 250 before a short downlink burst (e.g., a control signal burst, such as uplink grant 255). If the eCCA procedure 250 is successful, the base station may transmit a downlink trigger or uplink grant to tell the UE to transmit the uplink data burst e.g., the uplink data transmission 265. Based on receiving the uplink grant 255, this may signal to the UE that the downlink trigger has been received that indicates for the UE to send the uplink burst. Accordingly, the UE may perform the CCA procedure 260 (e.g., a one-shot or CAT-2 LBT/CCA procedure) before transmitting the uplink data transmission 265 to the base station. That is, the uplink burst may be sent after performing the CCA procedure 260 at the UE.

In some aspects, there may be some options to be considered with respect to the uplink scenario. For example, the base station in this situation is considered the receiving device, and therefore the eCCA procedure 250 can be used to initiate the CoT (e.g., no pre-grant is needed). In some aspects, CCA procedure 260 may be optional. For example, CCA procedure 260 may be performed if there is a future downlink burst from the base station in the same CoT (e.g., in a multiple-switching point or mixed uplink/downlink case). In some aspects, no pre-grant may be needed at the base station, but the pre-grant may be used for other purposes. For example, the base station may send an optional pre-grant granting the UE an uplink burst, and then send a downlink trigger for the grant after the eCCA procedure 250 is performed. The pre-grant may serve as an eCCA indicator, and include the eCCA link parameter n. After receiving the pre-grant, the UE may begin preparing the uplink burst assuming the indicated timing.

Figure 3:
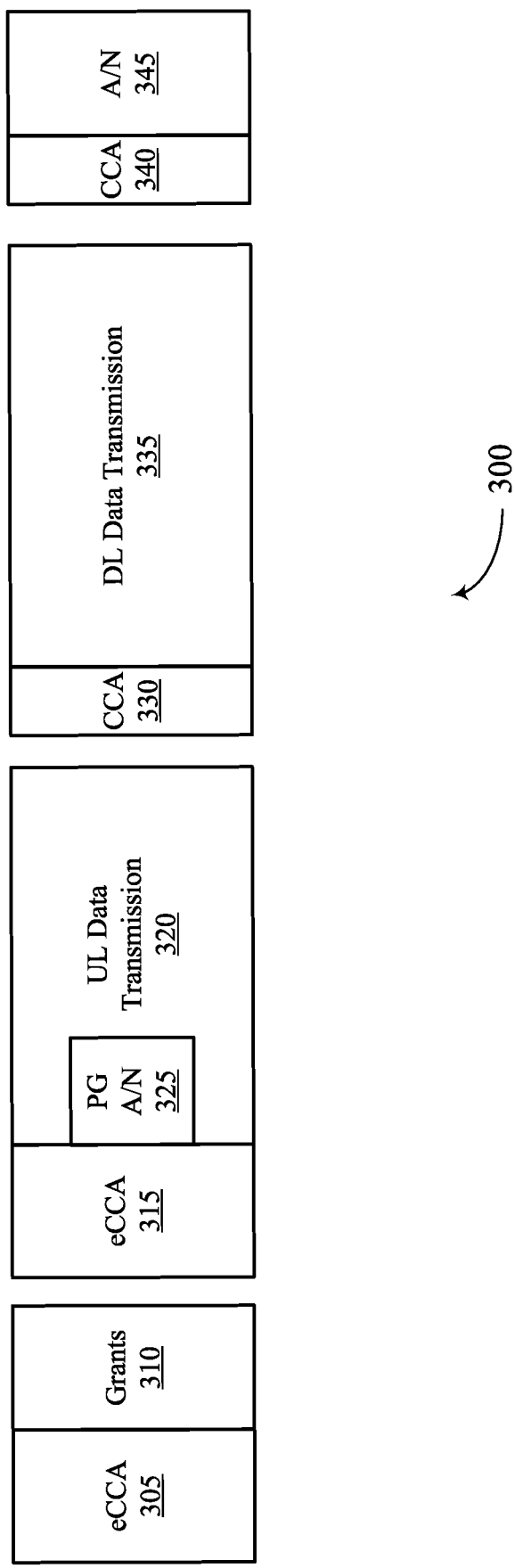
FIG. 3 illustrates an example of a CoT configuration that supports receiver side eCCA for unlicensed band in accordance with aspects of the present disclosure.

FIG. 3 illustrates an example of a CoT configuration 300 that supports receiver side eCCA for unlicensed band in accordance with aspects of the present disclosure. In some examples, CoT configuration 300 may implement aspects of wireless communication system 100 and/or CoT configuration 200. Aspects of CoT configuration 300 may be implemented by a base station and/or UE, which may be examples of the corresponding devices described herein. Broadly, CoT configuration 300 illustrates an example CoT that includes a mix of both uplink and downlink bursts (e.g., both uplink and downlink data transmissions) being performed.

For example, the base station may perform an eCCA procedure 305 (e.g., a full or CAT-4 LBT/CCA procedure). If the eCCA procedure 305 is successful, the base station may transmit grant 310 to the UE. For example, grant 310 may include an uplink grant for the UE to transmit the uplink data transmission to the base station and/or a downlink grant (e.g., a pre-grant) indicating that a downlink data transmission is scheduled for the UE. In some aspects, the grant 310 may indicate a timing parameter for the eCCA procedure 305 performed by the base station and/or for the eCCA procedure 315 to be performed by the UE. In some aspects, the grant 310 may indicate the CoT.

Upon receiving the grant 310, the UE may perform an eCCA procedure 315 (e.g., a full or CAT-4 LBT/CCA procedure). If the eCCA procedure 315 is successful, the UE may perform an uplink data transmission 320 to the base station. In some aspects, the UE may multiplex feedback information 325 for the grant 310 with the uplink data transmission 320. Upon receiving the uplink data transmission 320 with the multiplexed feedback information 325 for the grant 310, the base station may perform a CCA procedure 330 (e.g., a one-shot or CAT-2 LBT/CCA procedure). If the CCA procedure 330 is successful, the base station may transmit the downlink data transmission 335 to the UE. Upon successfully receiving and decoding the downlink data transmission 335, the UE may perform a CCA procedure 340 (e.g., a one-shot or CAT-2 LBT/CCA procedure). If the CCA procedure 340 is successful, the UE may transmit a feedback information transmission 345 for the downlink data transmission 335. The feedback information transmission 345 may be an A/N feedback information transmission confirming that the UE was able to successfully receive and decode the downlink data transmission 335.

Accordingly, CoT configuration 300 includes both the base station and UE performing eCCA procedures. The location of the eCCA procedure (e.g., when) at the UE can be flexible, but may be performed before the downlink data transmission 335. In some aspects, the location of the eCCA procedure at the UE can be the result of a scheduler decision. The feedback information 325 for the grant 310 may be piggybacked (e.g., multiplexed) with the uplink data transmission 320 (e.g., uplink control information (UCI) piggybacked). As illustrated in CoT configuration 300, there are two eCCA procedures being performed. In some aspects, the locations (e.g., when) each eCCA procedure is performed may be flexible, but may include the eCCA procedures being performed before the corresponding uplink data transmission 320 and/or the downlink data transmissions 335.

Figure 4:
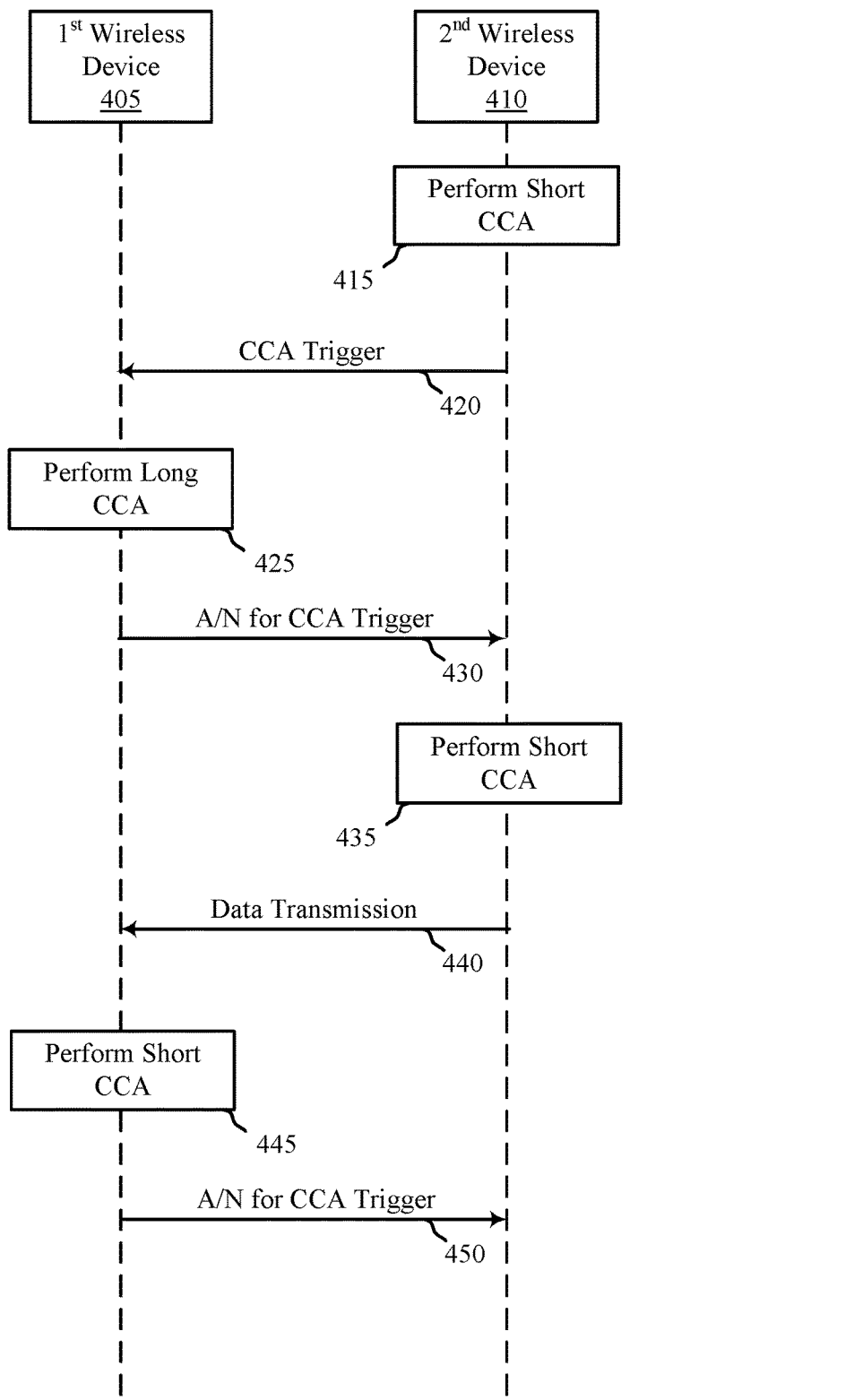
FIG. 4 illustrates an example of a process that supports receiver side eCCA for unlicensed band in accordance with aspects of the present disclosure.

FIG. 4 illustrates an example of a process 400 that supports receiver side eCCA for unlicensed band in accordance with aspects of the present disclosure. In some examples, process 400 may implement aspects of wireless communication system 100 and/or CoT configurations 200 and/or 300. Aspects of process 400 may be implemented by a first wireless device 405 and/or a second wireless device 410, which may be examples of the corresponding devices described herein. Generally, the first wireless device 405 may be considered a receiving device and the second wireless device 410 may be considered a transmitting device.

At 415, the second wireless device 410 may perform a short CCA procedure (e.g., a first CCA procedure from the perspective of the second wireless device 410). The short CCA procedure may be a CAT-2 or one-shot LBT/CCA procedure. The short CCA procedure may be an energy detection based CCA procedure where the second wireless device 410 monitors the channel to detect energy. The short CCA procedure may be successful if the second wireless device 410 detects energy below a threshold level, but unsuccessful if the second wireless device 410 detects energy at or above the threshold level on the channel. In some aspects, the channel may be associated with an unlicensed radio frequency spectrum band.

At 420, the second wireless device 410 may transmit (and the first wireless device 405 may receive) a CCA trigger associated with a data transmission by the second wireless device 410. The CCA trigger may be a grant or pre-grant scheduling the data transmission for the first wireless device 405. The CCA trigger may be transmitted over a control channel (e.g., a PDCCH/PUCCH). The CCA trigger may convey an indication of a duration for a long CCA procedure (e.g., an eCCA procedure) to be performed by the first wireless device 405. For example, the CCA trigger may explicitly convey the indication of the duration and/or the indication of the duration may be conveyed implicitly by using a particular resource configuration for the CCA trigger and/or for the first wireless device 405 to transmit feedback information for the CCA trigger. In some aspects, the CCA trigger may be transmitted based on the short CCA procedure performed at 415 being successful. In some aspects, the CCA trigger may carry or otherwise convey an indication of the CoT.

At 425, the first wireless device 405 may perform a long CCA procedure (e.g., an eCCA or CAT-4 LBT/CCA procedure). The duration for the long CCA procedure may be based on the indication conveyed in the CCA trigger and/or an associated or linked resource configuration. The long CCA procedure may be an energy detection based CCA procedure where the first wireless device 405 monitors the channel to detect energy. The long CCA procedure may be considered successful if the energy detected on the channel is below a threshold level, but unsuccessful if the energy detected on the channel is at or above a threshold level.

If the long CCA procedure is successful, at 430 the first wireless device 405 may transmit (and the second wireless device 410 may receive) feedback information for the CCA trigger. For example, the feedback information may include A/N information for the CCA trigger confirming that the first wireless device 405 was able to successfully receive and decode the CCA trigger.

In some aspects, the first wireless device 405 may determine that it has data for transmission to the second wireless device 410. Accordingly, the first wireless device 405 may multiplex its data with the feedback information for the CCA trigger in the same transmission burst to the second wireless device 410.

At 435, the second wireless device 410 may perform a short CCA procedure (e.g., a CAT-2 or one-shot LBT/CCA procedure). The short CCA procedure may be a CAT-2 or one-shot LBT/CCA procedure. The short CCA procedure may be an energy detection based CCA procedure where the second wireless device 410 monitors the channel to detect energy. The short CCA procedure may be successful if the second wireless device 410 detects energy below a threshold level, but unsuccessful if the second wireless device 410 detects energy at or above a threshold level on the channel.

In some aspects, the second wireless device 410 may determine that a gap period between receiving the feedback information for the CCA trigger and transmitting the data transmission satisfies a threshold. Accordingly, the short CCA procedure performed at 435 may be performed based on the gap period satisfying the threshold.

If the short CCA procedure is successful, at 440 the second wireless device 410 may transmit (and the first wireless device 405 may receive) the data transmission. The data transmission may be uplink data and/or downlink data. The data transmission may be transmitted over a data channel, such as a PDSCH/PUSCH.

At 445, the second wireless device 410 may perform a short CCA procedure (e.g., a CAT-2 or one-shot LBT/CCA procedure). The short CCA procedure may be a CAT-2 or one-shot LBT/CCA procedure. The short CCA procedure may be an energy detection based CCA procedure where the second wireless device 410 monitors the channel to detect energy. The short CCA procedure may be successful if the second wireless device 410 detects energy below a threshold level, but unsuccessful if the second wireless device 410 detects energy at or above a threshold level on the channel.

If the short CCA procedure is successful, at 450 the first wireless device 405 may transmit (and the second wireless device 410 may receive) feedback information for the data transmission. For example, the feedback information may include A/N information for the data transmission confirming that the first wireless device 405 was able to successfully receive and decode the data transmission.

In some aspects, the first wireless device 405 may determine that a gap period between receiving the data transmission and transmitting the feedback information for the data transmission satisfies a threshold. Accordingly, the short CCA procedure performed at 445 may be performed based on the gap period satisfying the threshold.

Figure 5:
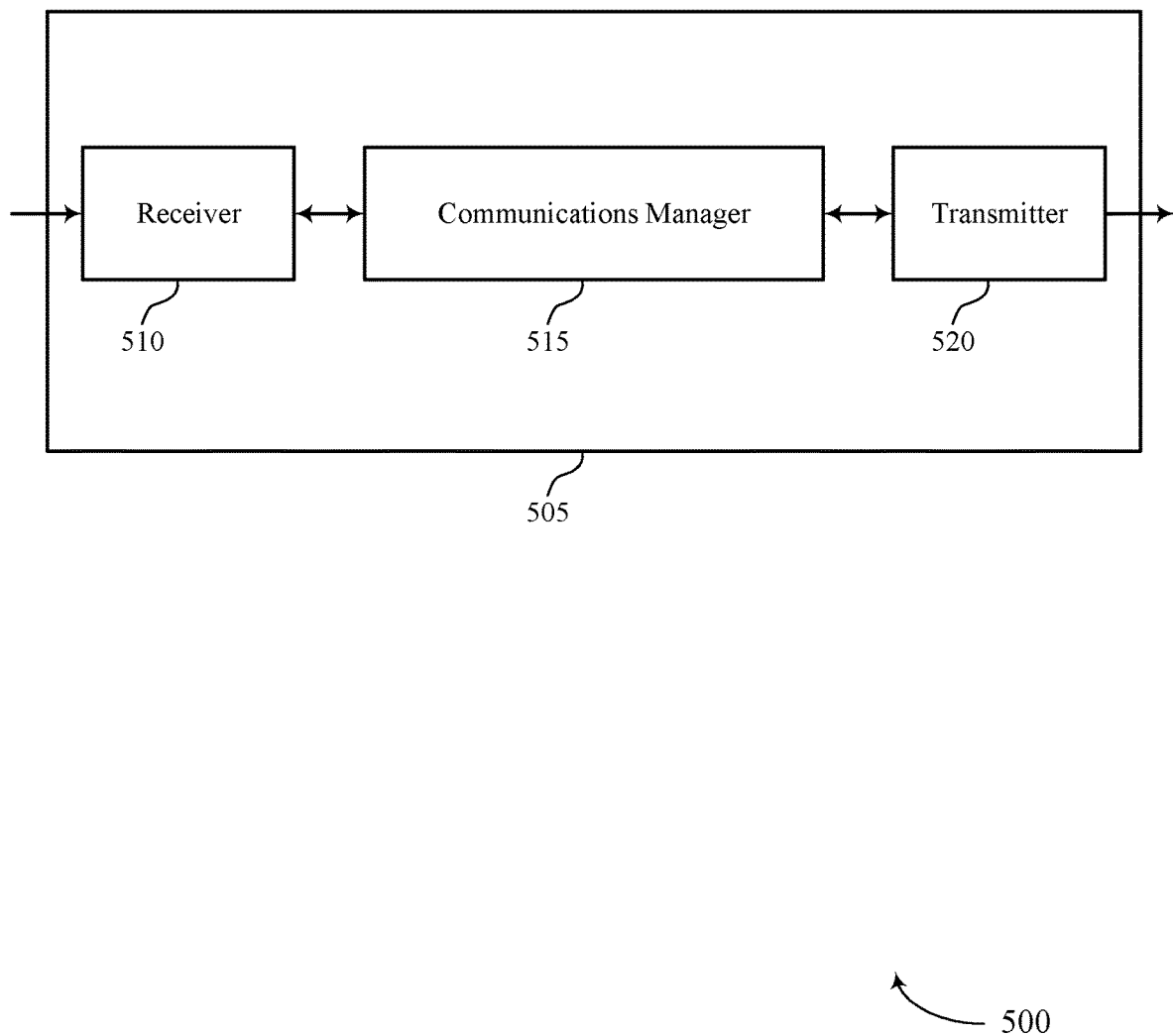
FIGS. 5 and 6 show block diagrams of devices that support receiver side eCCA for unlicensed band in accordance with aspects of the present disclosure.

FIG. 5 shows a block diagram 500 of a device 505 that supports receiver side eCCA for unlicensed band in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to receiver side eCCA for unlicensed band, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may receive, at a first wireless device, a CCA trigger from a second wireless device, the CCA trigger associated with a data transmission by the second wireless device, transmit, based on a result of a first CCA procedure, feedback information for the CCA trigger, receive the data transmission based on the feedback information for the first CCA procedure, and transmit, based on a result of a second CCA procedure, feedback information for the data transmission, where the first CCA procedure has a first duration that is longer than a second duration for the second CCA procedure.

The communications manager 515 may also transmit, based on a result of a first CCA procedure, a CCA trigger to a first wireless device, the CCA trigger associated with a data transmission by a second wireless device, receive, from the first wireless device, feedback information for the CCA trigger, transmit, based on a result of a second CCA procedure and responsive to the feedback information for the CCA trigger, the data transmission to the first wireless device, and receive feedback information for the data transmission from the first wireless device. The communications manager 515 may be an example of aspects of the communications manager 810 or 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
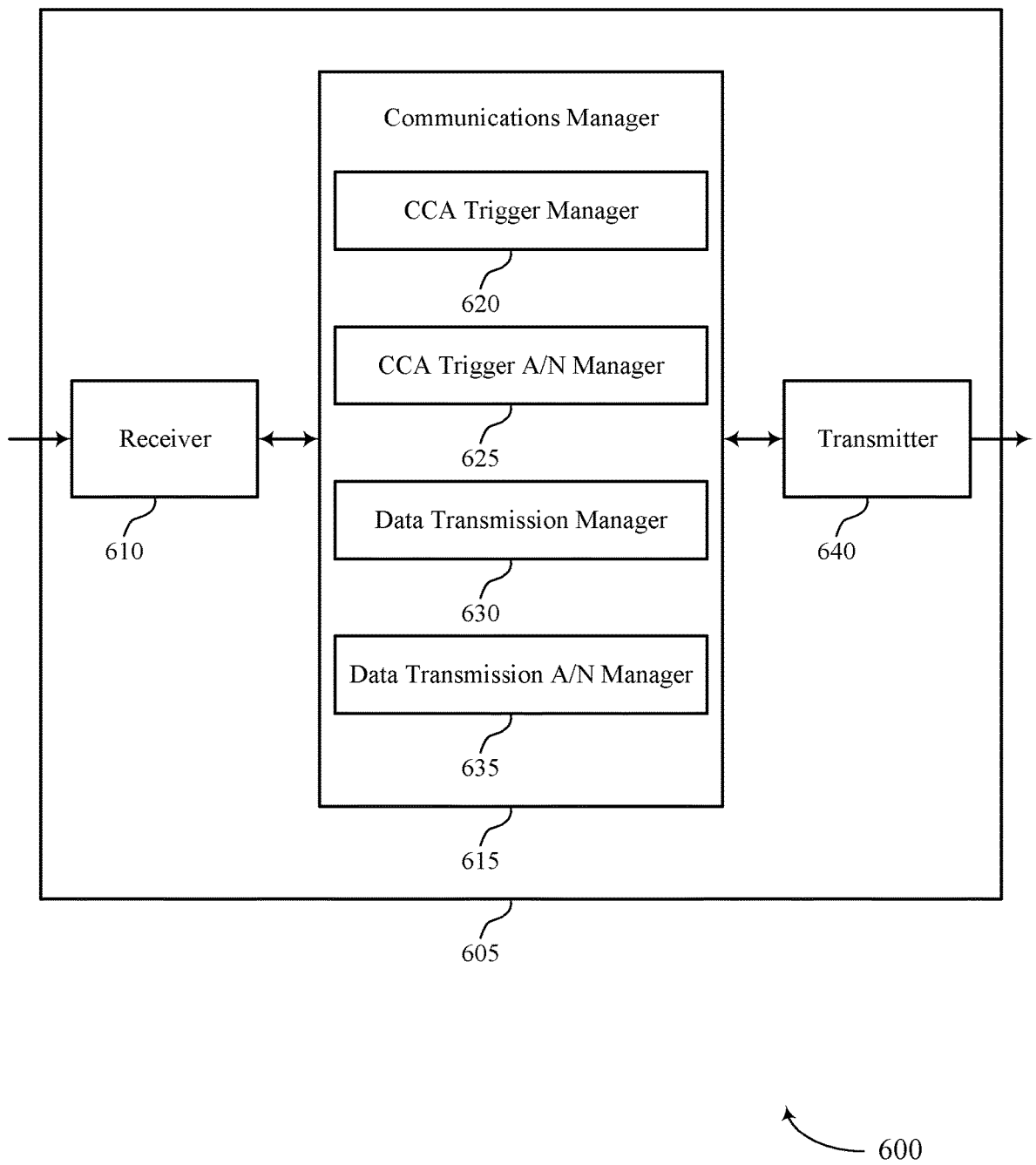

FIG. 6 shows a block diagram 600 of a device 605 that supports receiver side eCCA for unlicensed band in accordance with aspects of the present disclosure. The device 605 may be an example of aspects of a device 505, a UE 115, or a base station 105 as described herein. The device 605 may include a receiver 610, a communications manager 615, and a transmitter 640. The device 605 may also include a processor. Each of these components may be in communication with one another (e.g., via one or more buses).

Receiver 610 may receive information such as packets, user data, or control information associated with various information channels (e.g., control channels, data channels, and information related to receiver side eCCA for unlicensed band, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a CCA trigger manager 620, a CCA trigger A/N manager 625, a data transmission manager 630, and a data transmission A/N manager 635. The communications manager 615 may be an example of aspects of the communications manager 810 or 910 as described herein.

The CCA trigger manager 620 may receive, at a first wireless device, a CCA trigger from a second wireless device, the CCA trigger associated with a data transmission by the second wireless device.

The CCA trigger A/N manager 625 may transmit, based on a result of a first CCA procedure, feedback information for the CCA trigger.

The data transmission manager 630 may receive the data transmission based on the feedback information for the first CCA procedure.

The data transmission A/N manager 635 may transmit, based on a result of a second CCA procedure, feedback information for the data transmission, where the first CCA procedure has a first duration that is longer than a second duration for the second CCA procedure.

The CCA trigger manager 620 may transmit, based on a result of a first CCA procedure, a CCA trigger to a first wireless device, the CCA trigger associated with a data transmission by a second wireless device.

The CCA trigger A/N manager 625 may receive, from the first wireless device, feedback information for the CCA trigger.

The data transmission manager 630 may transmit, based on a result of a second CCA procedure and responsive to the feedback information for the CCA trigger, the data transmission to the first wireless device.

The data transmission A/N manager 635 may receive feedback information for the data transmission from the first wireless device.

Transmitter 640 may transmit signals generated by other components of the device 605. In some examples, the transmitter 640 may be collocated with a receiver 610 in a transceiver module. For example, the transmitter 640 may be an example of aspects of the transceiver 820 or 920 as described with reference to FIGS. 8 and 9. The transmitter 640 may utilize a single antenna or a set of antennas.

Figure 7:
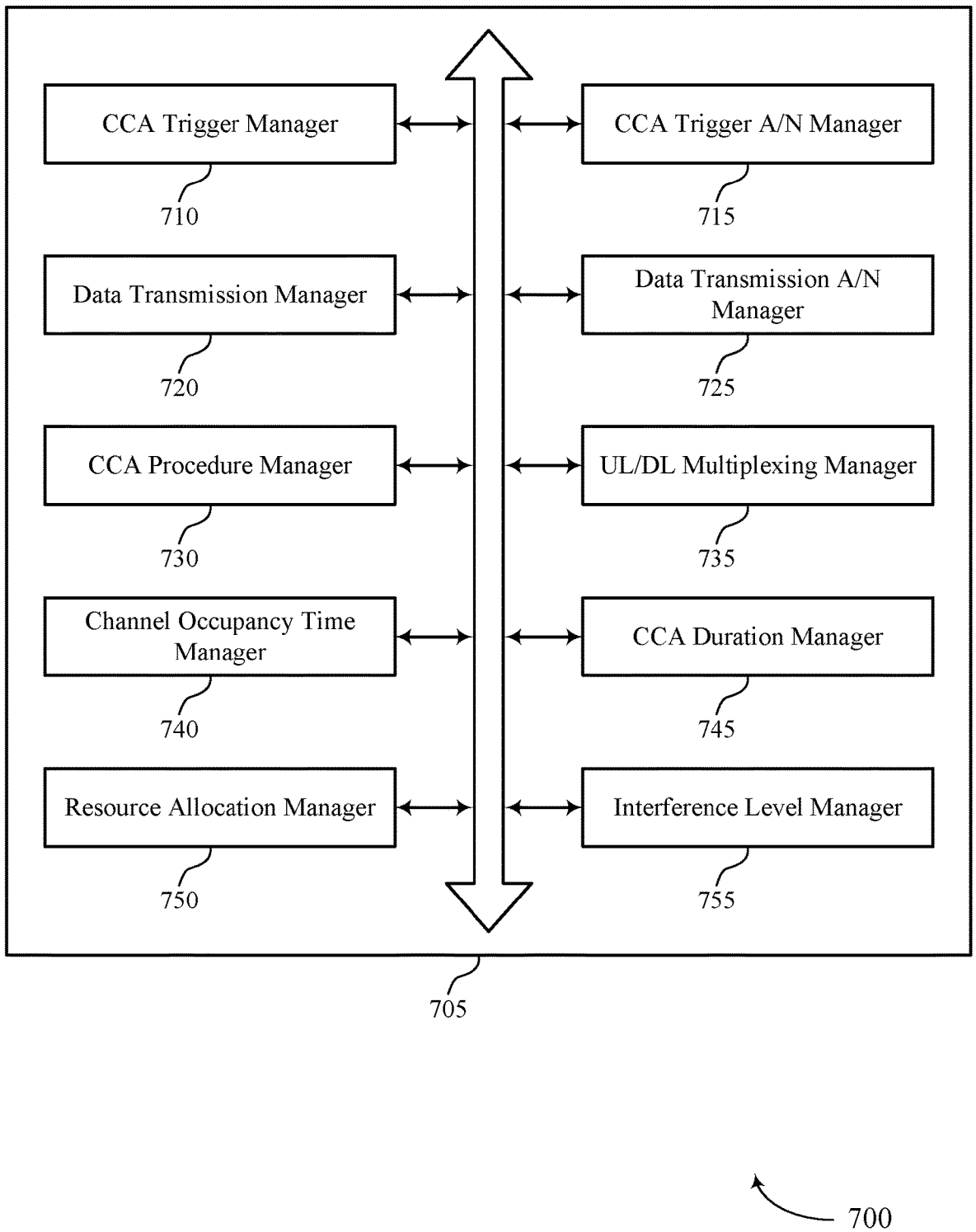
FIG. 7 shows a block diagram of a communications manager that supports receiver side eCCA for unlicensed band in accordance with aspects of the present disclosure.

FIG. 7 shows a block diagram 700 of a communications manager 705 that supports receiver side eCCA for unlicensed band in accordance with aspects of the present disclosure. The communications manager 705 may be an example of aspects of a communications manager 515, a communications manager 615, or a communications manager 810 described herein. The communications manager 705 may include a CCA trigger manager 710, a CCA trigger A/N manager 715, a data transmission manager 720, a data transmission A/N manager 725, a CCA procedure manager 730, an UL/DL multiplexing manager 735, a channel occupancy time manager 740, a CCA duration manager 745, a resource allocation manager 750, and an interference level manager 755. Each of these modules may communicate, directly or indirectly, with one another (e.g., via one or more buses).

The CCA trigger manager 710 may receive, at a first wireless device, a CCA trigger from a second wireless device, the CCA trigger associated with a data transmission by the second wireless device. In some examples, the CCA trigger manager 710 may transmit, based on a result of a first CCA procedure, a CCA trigger to a first wireless device, the CCA trigger associated with a data transmission by a second wireless device.

The CCA trigger A/N manager 715 may transmit, based on a result of a first CCA procedure, feedback information for the CCA trigger. In some examples, the CCA trigger A/N manager 715 may receive, from the first wireless device, feedback information for the CCA trigger.

The data transmission manager 720 may receive the data transmission based on the feedback information for the first CCA procedure. In some examples, the data transmission manager 720 may transmit, based on a result of a second CCA procedure and responsive to the feedback information for the CCA trigger, the data transmission to the first wireless device.

The data transmission A/N manager 725 may transmit, based on a result of a second CCA procedure, feedback information for the data transmission, where the first CCA procedure has a first duration that is longer than a second duration for the second CCA procedure. In some examples, the data transmission A/N manager 725 may receive feedback information for the data transmission from the first wireless device.

The CCA procedure manager 730 may transmit the feedback information if the first CCA procedure is successful. In some examples, the CCA procedure manager 730 may determine that a gap period between receiving the data transmission and transmitting the feedback information for the data transmission satisfies a threshold, where the second channel assessment procedure is performed based on the gap period satisfying the threshold. In some examples, the CCA procedure manager 730 may transmit the CCA trigger to trigger the data transmission to the first wireless device if the first CCA procedure is successful.

The UL/DL multiplexing manager 735 may determine that the first wireless device has data for transmission to the second wireless device. In some examples, the UL/DL multiplexing manager 735 may multiplex the data and the feedback information for the first CCA trigger in a same transmission burst to the second wireless device. In some examples, the UL/DL multiplexing manager 735 may determine that the first wireless device has data for transmission to the second wireless device. In some examples, the UL/DL multiplexing manager 735 may receive the data multiplexed with the feedback information for the first CCA trigger in a same transmission burst from the first wireless device. In some examples, the UL/DL multiplexing manager 735 may select, based on the data, a first duration for the first CCA procedure, where the first duration is longer than a second duration for the second CCA procedure.

The channel occupancy time manager 740 may determine, based on the CCA trigger, a channel occupancy time for the data transmission. In some examples, the channel occupancy time manager 740 may determine, based on the first CCA procedure, a channel occupancy time for the data transmission.

The CCA duration manager 745 may determine, based on the CCA trigger, a gap duration between receiving the data transmission and transmitting the feedback information for the data transmission. In some examples, the CCA duration manager 745 may select the second duration for the second CCA procedure based on the gap duration. In some examples, the CCA duration manager 745 may determine the first duration for the first CCA procedure based on the CCA trigger. In some examples, the CCA duration manager 745 may identify a duration for a third CCA procedure for the first wireless device to perform before transmitting the feedback information for the CCA trigger.

In some examples, the CCA duration manager 745 may select a resource allocation for the first wireless device to use to transmit the feedback information for the CCA trigger based on the duration for the third CCA procedure. In some examples, the CCA duration manager 745 may transmit the resource allocation to the first wireless device. In some examples, the CCA duration manager 745 may determine that a gap period between receiving the feedback information for the CCA trigger and transmitting the data transmission satisfies a threshold, where the second CCA procedure is performed based on the gap period satisfying the threshold.

The resource allocation manager 750 may receive a resource allocation for transmitting the feedback information for the CCA trigger. In some examples, the resource allocation manager 750 may determine the first duration of the first CCA procedure based on the resource allocation for transmitting the feedback information for the CCA trigger.

The interference level manager 755 may determine that an interference level for a channel used for communicating with the first wireless device has a threshold rate of change, where the second CCA procedure is performed based on the threshold rate of change.

Figure 8:
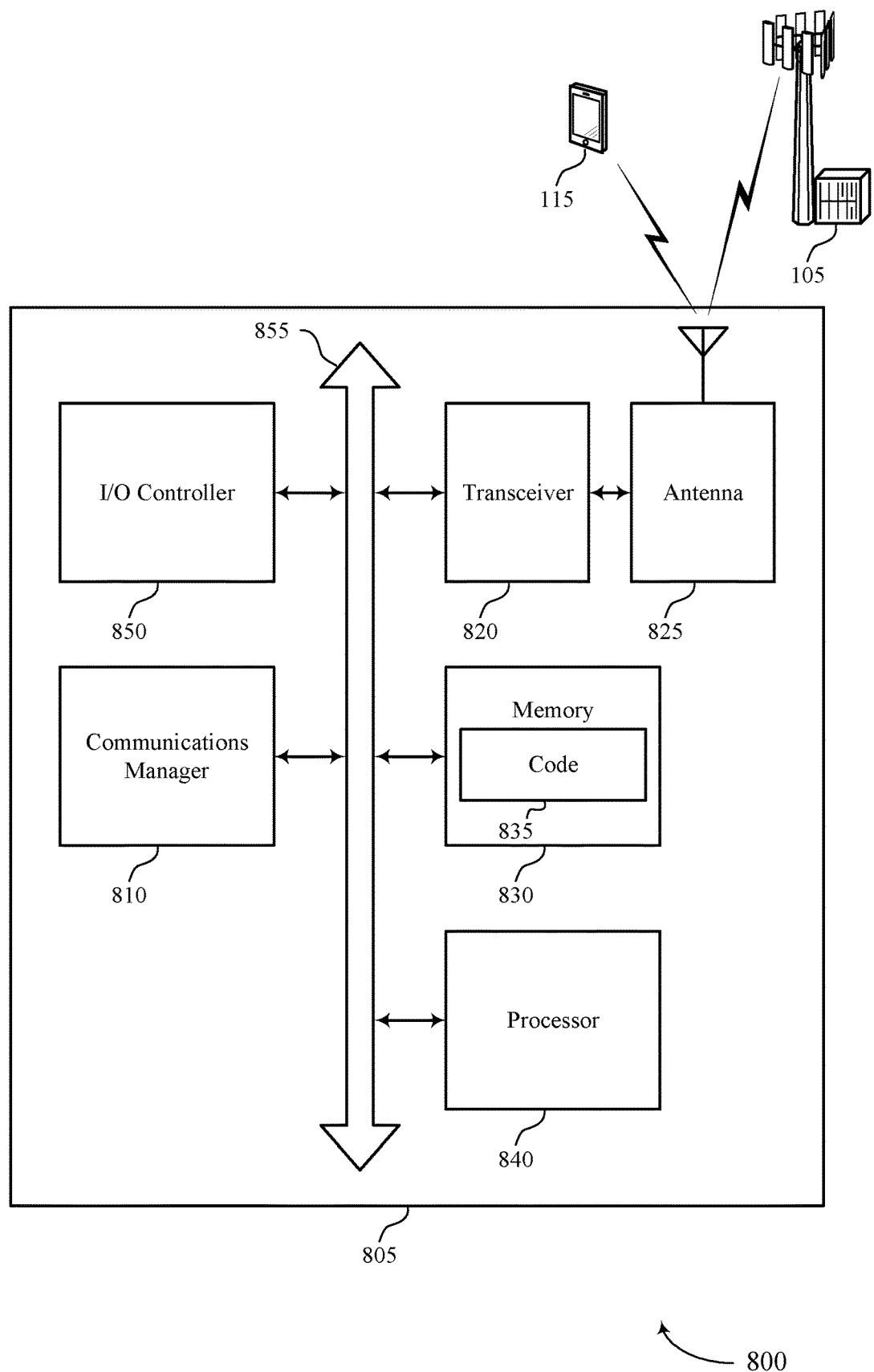
FIG. 8 shows a diagram of a system including a user equipment (UE) that supports receiver side eCCA for unlicensed band in accordance with aspects of the present disclosure.

FIG. 8 shows a diagram of a system 800 including a device 805 that supports receiver side eCCA for unlicensed band in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may receive, at a first wireless device, a CCA trigger from a second wireless device, the CCA trigger associated with a data transmission by the second wireless device, transmit, based on a result of a first CCA procedure, feedback information for the CCA trigger, receive the data transmission based on the feedback information for the first CCA procedure, and transmit, based on a result of a second CCA procedure, feedback information for the data transmission, where the first CCA procedure has a first duration that is longer than a second duration for the second CCA procedure. The communications manager 810 may also transmit, based on a result of a first CCA procedure, a CCA trigger to a first wireless device, the CCA trigger associated with a data transmission by a second wireless device, receive, from the first wireless device, feedback information for the CCA trigger, transmit, based on a result of a second CCA procedure and responsive to the feedback information for the CCA trigger, the data transmission to the first wireless device, and receive feedback information for the data transmission from the first wireless device.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting receiver side eCCA for unlicensed band).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
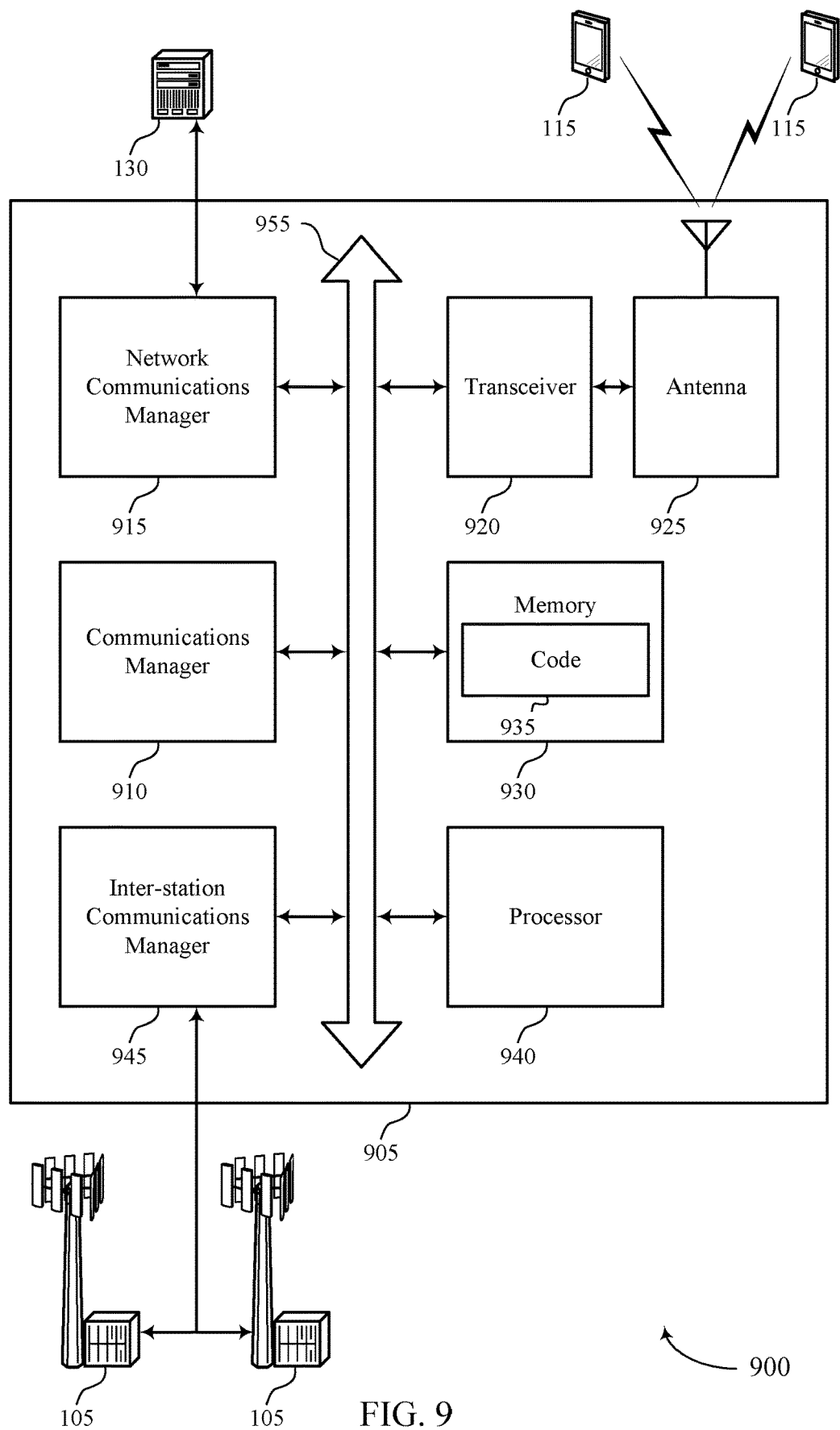
FIG. 9 shows a diagram of a system including a base station that supports receiver side eCCA for unlicensed band in accordance with aspects of the present disclosure.

FIG. 9 shows a diagram of a system 900 including a device 905 that supports receiver side eCCA for unlicensed band in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may receive, at a first wireless device, a CCA trigger from a second wireless device, the CCA trigger associated with a data transmission by the second wireless device, transmit, based on a result of a first CCA procedure, feedback information for the CCA trigger, receive the data transmission based on the feedback information for the first CCA procedure, and transmit, based on a result of a second CCA procedure, feedback information for the data transmission, where the first CCA procedure has a first duration that is longer than a second duration for the second CCA procedure. The communications manager 910 may also transmit, based on a result of a first CCA procedure, a CCA trigger to a first wireless device, the CCA trigger associated with a data transmission by a second wireless device, receive, from the first wireless device, feedback information for the CCA trigger, transmit, based on a result of a second CCA procedure and responsive to the feedback information for the CCA trigger, the data transmission to the first wireless device, and receive feedback information for the data transmission from the first wireless device.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting receiver side eCCA for unlicensed band).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
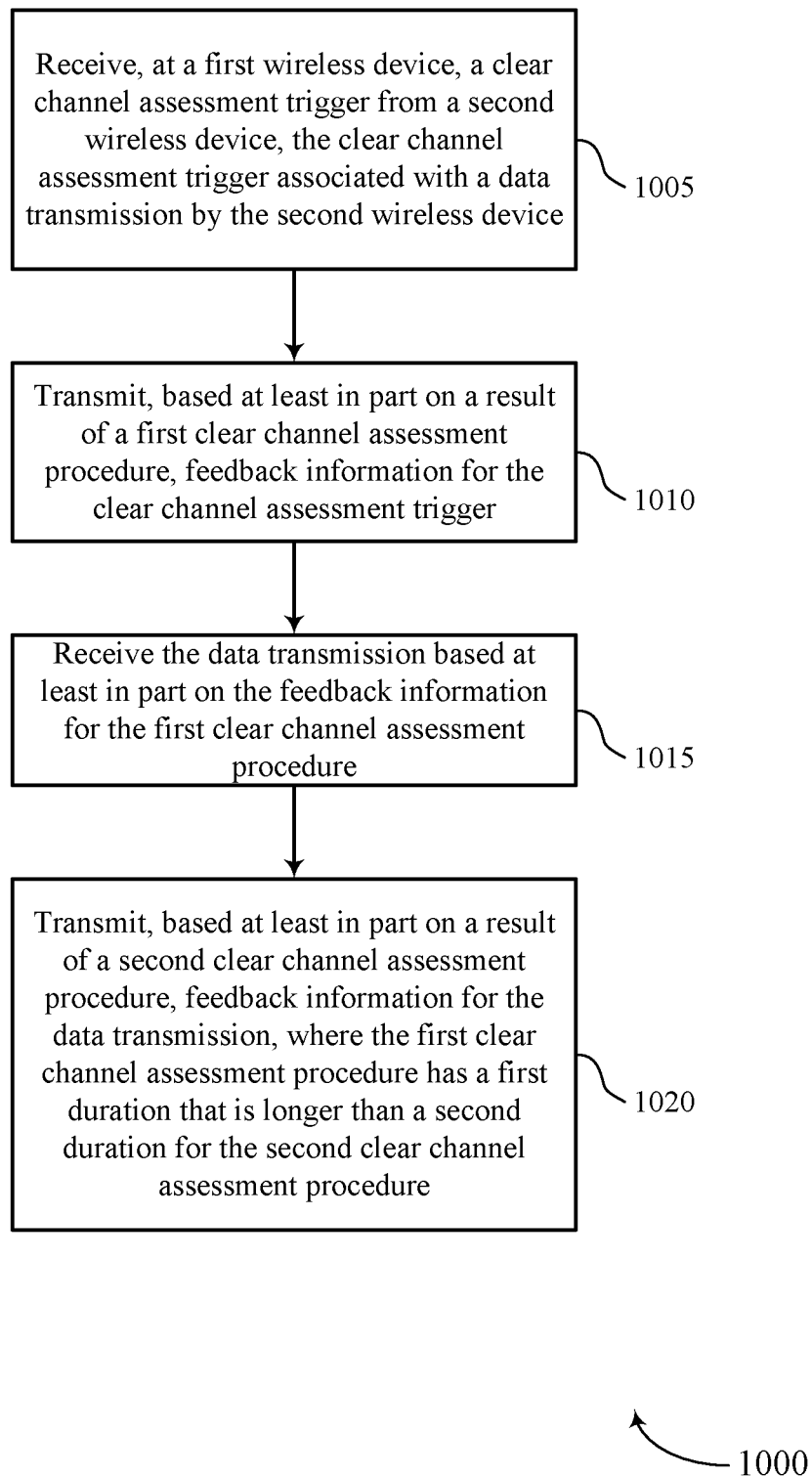
FIGS. 10 through 14 show flowcharts illustrating methods that support receiver side eCCA for unlicensed band in accordance with aspects of the present disclosure.

FIG. 10 shows a flowchart illustrating a method 1000 that supports receiver side eCCA for unlicensed band in accordance with aspects of the present disclosure. The operations of method 1000 may be implemented by a UE 115 or base station 105 or its components as described herein. For example, the operations of method 1000 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1005, the UE or base station may receive, at a first wireless device, a CCA trigger from a second wireless device, the CCA trigger associated with a data transmission by the second wireless device. The operations of 1005 may be performed according to the methods described herein. In some examples, aspects of the operations of 1005 may be performed by a CCA trigger manager as described with reference to FIGS. 5 through 9.

At 1010, the UE or base station may transmit, based at least in part on a result of a first CCA procedure, feedback information for the CCA trigger. The operations of 1010 may be performed according to the methods described herein. In some examples, aspects of the operations of 1010 may be performed by a CCA trigger A/N manager as described with reference to FIGS. 5 through 9.

At 1015, the UE or base station may receive the data transmission based at least in part on the feedback information for the first CCA procedure. The operations of 1015 may be performed according to the methods described herein. In some examples, aspects of the operations of 1015 may be performed by a data transmission manager as described with reference to FIGS. 5 through 9.

At 1020, the UE or base station may transmit, based at least in part on a result of a second CCA procedure, feedback information for the data transmission, where the first CCA procedure has a first duration that is longer than a second duration for the second CCA procedure. The operations of 1020 may be performed according to the methods described herein. In some examples, aspects of the operations of 1020 may be performed by a data transmission A/N manager as described with reference to FIGS. 5 through 9.

Figure 11:
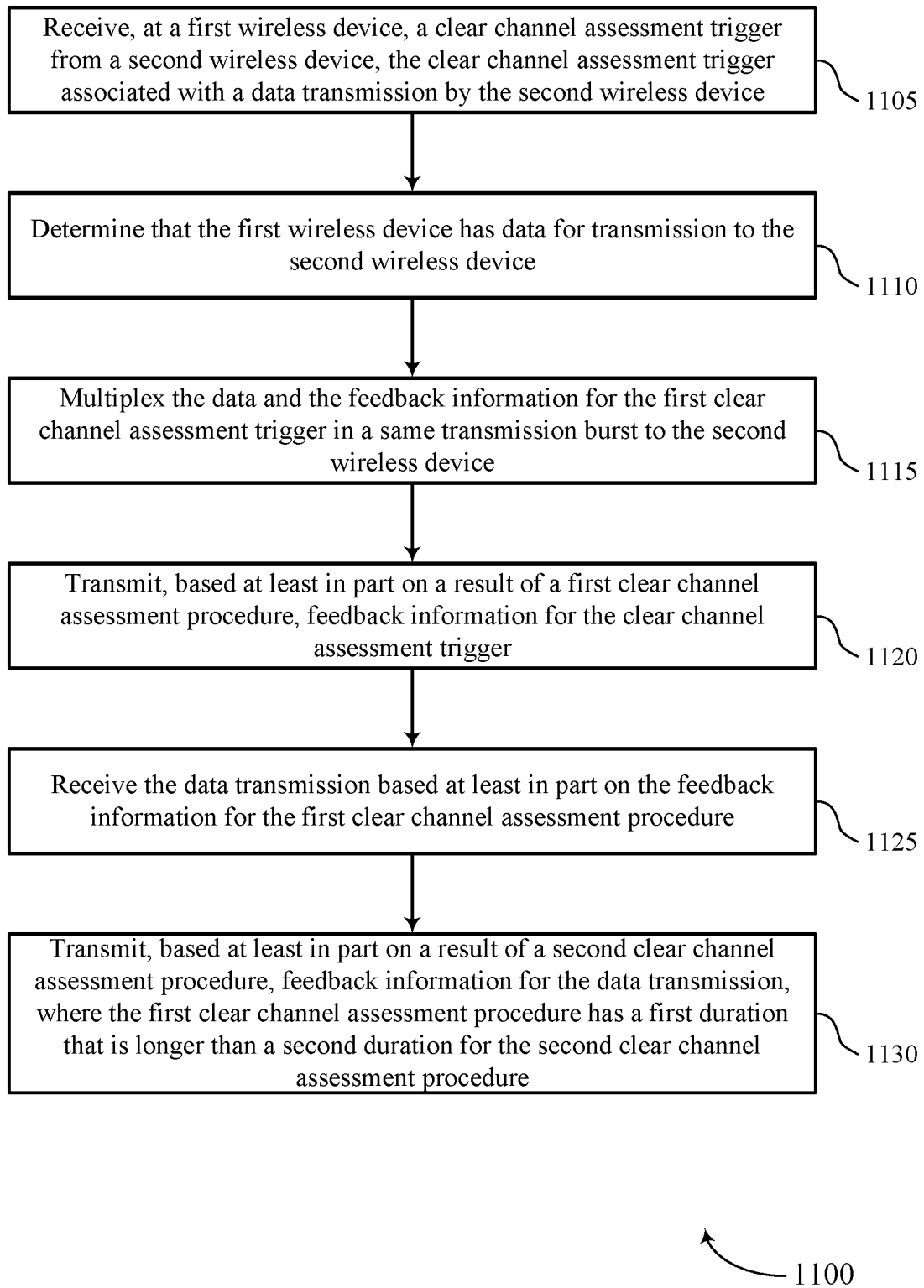

FIG. 11 shows a flowchart illustrating a method 1100 that supports receiver side eCCA for unlicensed band in accordance with aspects of the present disclosure. The operations of method 1100 may be implemented by a UE 115 or base station 105 or its components as described herein. For example, the operations of method 1100 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may receive, at a first wireless device, a CCA trigger from a second wireless device, the CCA trigger associated with a data transmission by the second wireless device. The operations of 1105 may be performed according to the methods described herein. In some examples, aspects of the operations of 1105 may be performed by a CCA trigger manager as described with reference to FIGS. 5 through 9.

At 1110, the UE or base station may determine that the first wireless device has data for transmission to the second wireless device. The operations of 1110 may be performed according to the methods described herein. In some examples, aspects of the operations of 1110 may be performed by an UL/DL multiplexing manager as described with reference to FIGS. 5 through 9.

At 1115, the UE or base station may multiplex the data and the feedback information for the first CCA trigger in a same transmission burst to the second wireless device. The operations of 1115 may be performed according to the methods described herein. In some examples, aspects of the operations of 1115 may be performed by an UL/DL multiplexing manager as described with reference to FIGS. 5 through 9.

At 1120, the UE or base station may transmit, based at least in part on a result of a first CCA procedure, feedback information for the CCA trigger. The operations of 1120 may be performed according to the methods described herein. In some examples, aspects of the operations of 1120 may be performed by a CCA trigger A/N manager as described with reference to FIGS. 5 through 9.

At 1125, the UE or base station may receive the data transmission based at least in part on the feedback information for the first CCA procedure. The operations of 1125 may be performed according to the methods described herein. In some examples, aspects of the operations of 1125 may be performed by a data transmission manager as described with reference to FIGS. 5 through 9.

At 1130, the UE or base station may transmit, based at least in part on a result of a second CCA procedure, feedback information for the data transmission, where the first CCA procedure has a first duration that is longer than a second duration for the second CCA procedure. The operations of 1130 may be performed according to the methods described herein. In some examples, aspects of the operations of 1130 may be performed by a data transmission A/N manager as described with reference to FIGS. 5 through 9.

Figure 12:
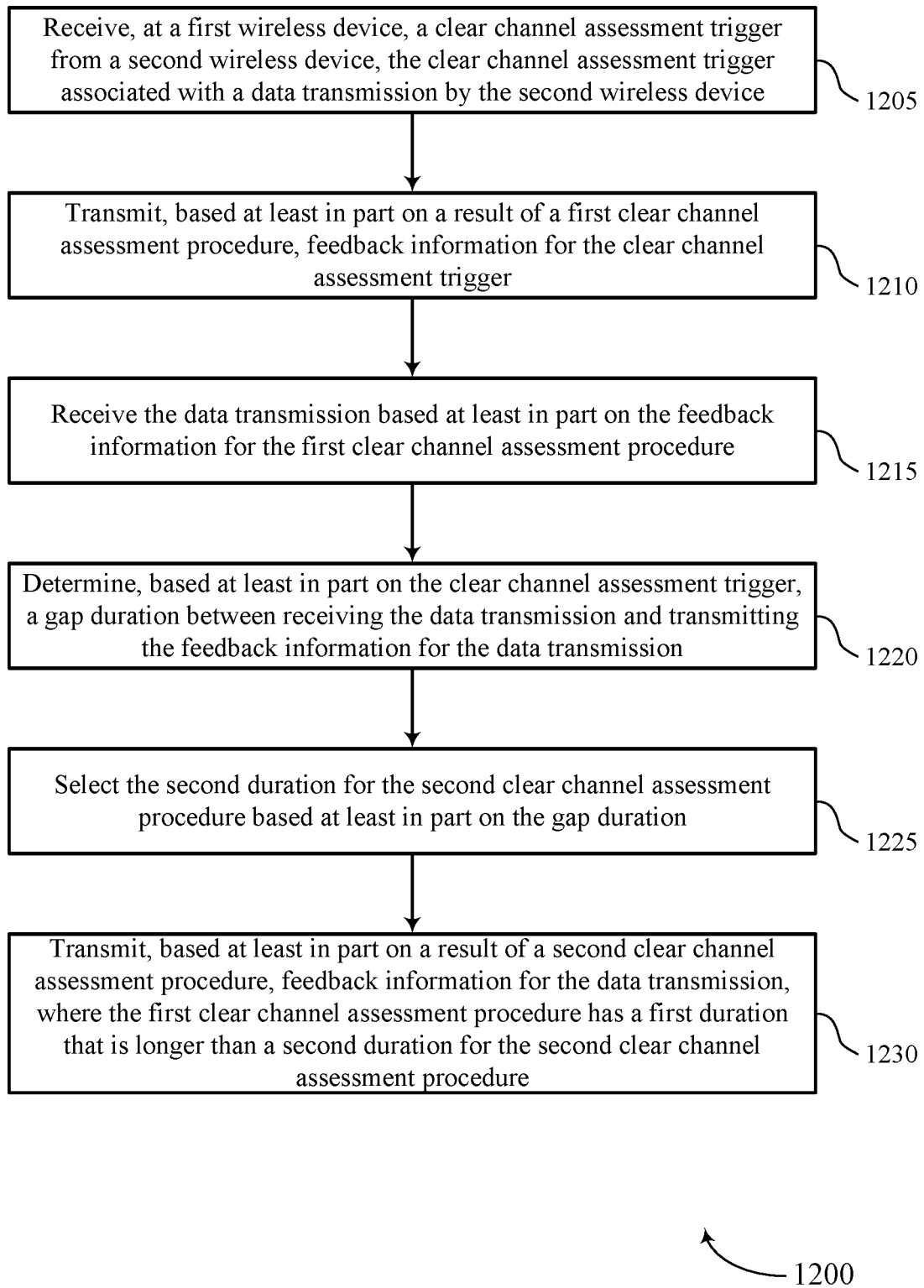

FIG. 12 shows a flowchart illustrating a method 1200 that supports receiver side eCCA for unlicensed band in accordance with aspects of the present disclosure. The operations of method 1200 may be implemented by a UE 115 or base station 105 or its components as described herein. For example, the operations of method 1200 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may receive, at a first wireless device, a CCA trigger from a second wireless device, the CCA trigger associated with a data transmission by the second wireless device. The operations of 1205 may be performed according to the methods described herein. In some examples, aspects of the operations of 1205 may be performed by a CCA trigger manager as described with reference to FIGS. 5 through 9.

At 1210, the UE or base station may transmit, based at least in part on a result of a first CCA procedure, feedback information for the CCA trigger. The operations of 1210 may be performed according to the methods described herein. In some examples, aspects of the operations of 1210 may be performed by a CCA trigger A/N manager as described with reference to FIGS. 5 through 9.

At 1215, the UE or base station may receive the data transmission based at least in part on the feedback information for the first CCA procedure. The operations of 1215 may be performed according to the methods described herein. In some examples, aspects of the operations of 1215 may be performed by a data transmission manager as described with reference to FIGS. 5 through 9.

At 1220, the UE or base station may determine, based at least in part on the CCA trigger, a gap duration between receiving the data transmission and transmitting the feedback information for the data transmission. The operations of 1220 may be performed according to the methods described herein. In some examples, aspects of the operations of 1220 may be performed by a CCA duration manager as described with reference to FIGS. 5 through 9.

At 1225, the UE or base station may select the second duration for the second CCA procedure based at least in part on the gap duration. The operations of 1225 may be performed according to the methods described herein. In some examples, aspects of the operations of 1225 may be performed by a CCA duration manager as described with reference to FIGS. 5 through 9.

At 1230, the UE or base station may transmit, based at least in part on a result of a second CCA procedure, feedback information for the data transmission, where the first CCA procedure has a first duration that is longer than a second duration for the second CCA procedure. The operations of 1230 may be performed according to the methods described herein. In some examples, aspects of the operations of 1230 may be performed by a data transmission A/N manager as described with reference to FIGS. 5 through 9.

Figure 13:
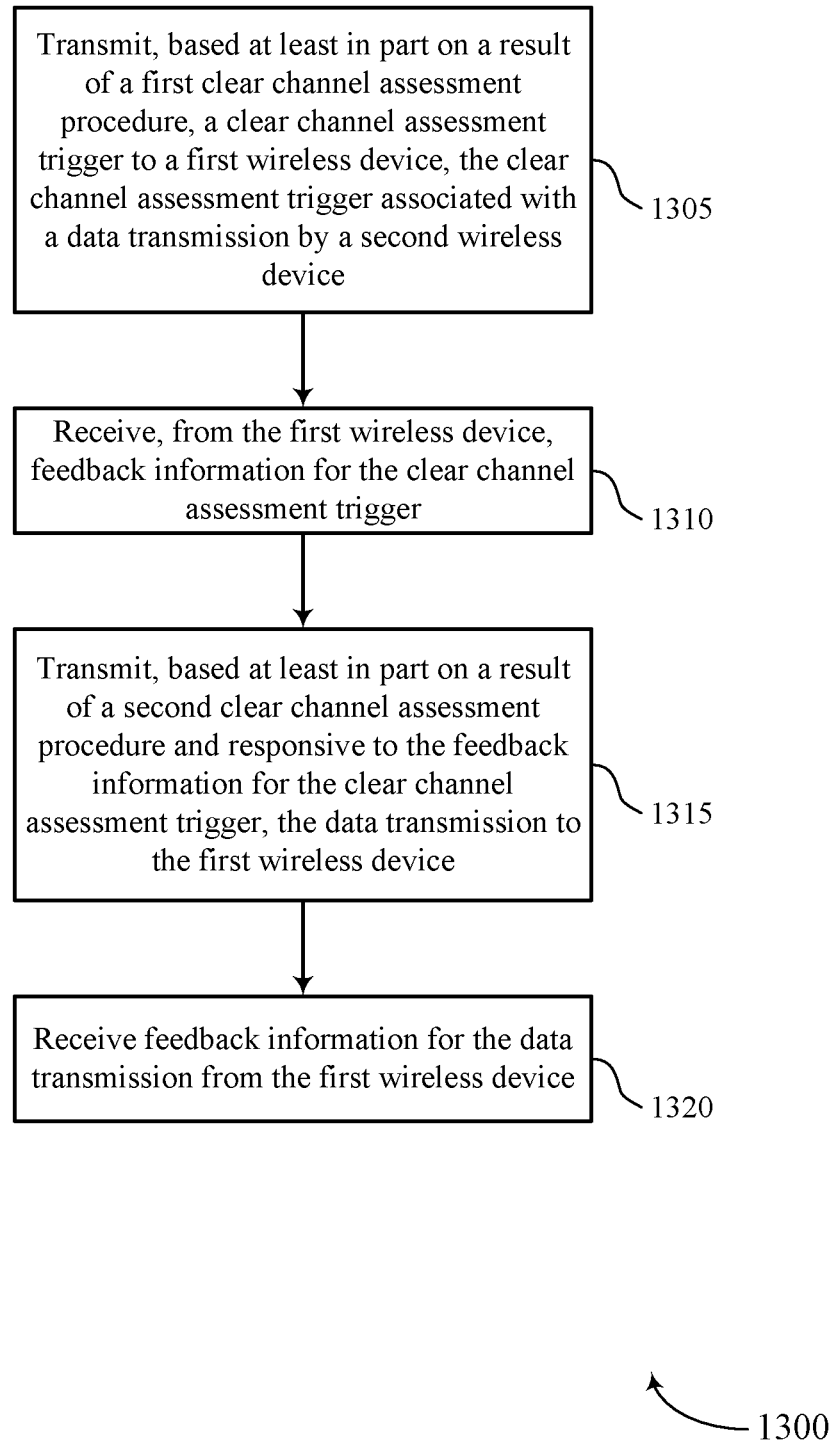

FIG. 13 shows a flowchart illustrating a method 1300 that supports receiver side eCCA for unlicensed band in accordance with aspects of the present disclosure. The operations of method 1300 may be implemented by a UE 115 or base station 105 or its components as described herein. For example, the operations of method 1300 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may transmit, based at least in part on a result of a first CCA procedure, a CCA trigger to a first wireless device, the CCA trigger associated with a data transmission by a second wireless device. The operations of 1305 may be performed according to the methods described herein. In some examples, aspects of the operations of 1305 may be performed by a CCA trigger manager as described with reference to FIGS. 5 through 9.

At 1310, the UE or base station may receive, from the first wireless device, feedback information for the CCA trigger. The operations of 1310 may be performed according to the methods described herein. In some examples, aspects of the operations of 1310 may be performed by a CCA trigger A/N manager as described with reference to FIGS. 5 through 9.

At 1315, the UE or base station may transmit, based at least in part on a result of a second CCA procedure and responsive to the feedback information for the CCA trigger, the data transmission to the first wireless device. The operations of 1315 may be performed according to the methods described herein. In some examples, aspects of the operations of 1315 may be performed by a data transmission manager as described with reference to FIGS. 5 through 9.

At 1320, the UE or base station may receive feedback information for the data transmission from the first wireless device. The operations of 1320 may be performed according to the methods described herein. In some examples, aspects of the operations of 1320 may be performed by a data transmission A/N manager as described with reference to FIGS. 5 through 9.

Figure 14:
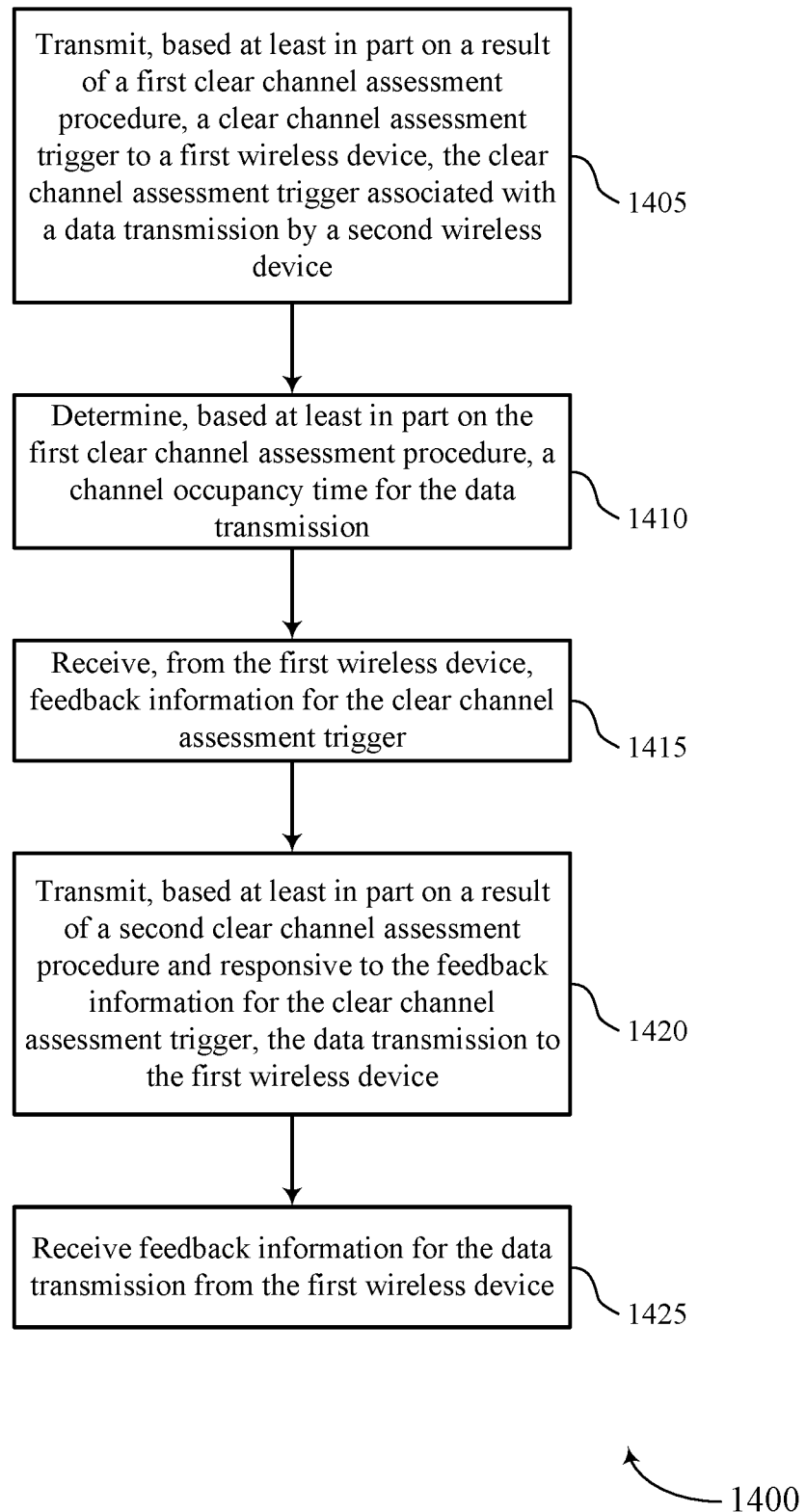

FIG. 14 shows a flowchart illustrating a method 1400 that supports receiver side eCCA for unlicensed band in accordance with aspects of the present disclosure. The operations of method 1400 may be implemented by a UE 115 or base station 105 or its components as described herein. For example, the operations of method 1400 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may transmit, based at least in part on a result of a first CCA procedure, a CCA trigger to a first wireless device, the CCA trigger associated with a data transmission by a second wireless device. The operations of 1405 may be performed according to the methods described herein. In some examples, aspects of the operations of 1405 may be performed by a CCA trigger manager as described with reference to FIGS. 5 through 9.

At 1410, the UE or base station may determine, based at least in part on the first CCA procedure, a channel occupancy time for the data transmission. The operations of 1410 may be performed according to the methods described herein. In some examples, aspects of the operations of 1410 may be performed by a channel occupancy time manager as described with reference to FIGS. 5 through 9.

At 1415, the UE or base station may receive, from the first wireless device, feedback information for the CCA trigger. The operations of 1415 may be performed according to the methods described herein. In some examples, aspects of the operations of 1415 may be performed by a CCA trigger A/N manager as described with reference to FIGS. 5 through 9.

At 1420, the UE or base station may transmit, based at least in part on a result of a second CCA procedure and responsive to the feedback information for the CCA trigger, the data transmission to the first wireless device. The operations of 1420 may be performed according to the methods described herein. In some examples, aspects of the operations of 1420 may be performed by a data transmission manager as described with reference to FIGS. 5 through 9.

At 1425, the UE or base station may receive feedback information for the data transmission from the first wireless device. The operations of 1425 may be performed according to the methods described herein. In some examples, aspects of the operations of 1425 may be performed by a data transmission A/N manager as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication, comprising: receiving, at a first wireless device, a CCA trigger from a second wireless device, the CCA trigger associated with a data transmission by the second wireless device; transmitting, based at least in part on a result of a first CCA procedure, feedback information for the CCA trigger; receiving the data transmission based at least in part on the feedback information for the first CCA procedure; and transmitting, based at least in part on a result of a second CCA procedure, feedback information for the data transmission, wherein the first CCA procedure has a first duration that is longer than a second duration for the second CCA procedure.

Aspect 2: The method of aspect 1, wherein transmitting, based at least in part on the result of the first CCA procedure, feedback information for the CCA trigger comprises: transmitting the feedback information if the first CCA procedure is successful.

Aspect 3: The method of any of aspects 1 through 2, further comprising: determining that the first wireless device has data for transmission to the second wireless device; and multiplexing the data and the feedback information for the first CCA trigger in a same transmission burst to the second wireless device.

Aspect 4: The method of any of aspects 1 through 3, further comprising: determining, based at least in part on the CCA trigger, a channel occupancy time for the data transmission.

Aspect 5: The method of any of aspects 1 through 4, further comprising: determining, based at least in part on the CCA trigger, a gap duration between receiving the data transmission and transmitting the feedback information for the data transmission; and selecting the second duration for the second CCA procedure based at least in part on the gap duration.

Aspect 6: The method of any of aspects 1 through 5, further comprising: determining the first duration for the first CCA procedure based on the CCA trigger.

Aspect 7: The method of any of aspects 1 through 6, further comprising: receiving a resource allocation for transmitting the feedback information for the CCA trigger; and determining the first duration of the first CCA procedure based on the resource allocation for transmitting the feedback information for the CCA trigger.

Aspect 8: The method of any of aspects 1 through 7, further comprising: determining that a gap period between receiving the data transmission and transmitting the feedback information for the data transmission satisfies a threshold, wherein the second channel assessment procedure is performed based at least in part on the gap period satisfying the threshold.

Aspect 9: A method for wireless communication: transmitting, based at least in part on a result of a first CCA procedure, a CCA trigger to a first wireless device, the CCA trigger associated with a data transmission by a second wireless device; receiving, from the first wireless device, feedback information for the CCA trigger; transmitting, based at least in part on a result of a second CCA procedure and responsive to the feedback information for the CCA trigger, the data transmission to the first wireless device; and receiving feedback information for the data transmission from the first wireless device.

Aspect 10: The method of aspect 9, wherein transmitting the CCA trigger comprises: transmitting the CCA trigger to trigger the data transmission to the first wireless device if the first CCA procedure is successful.

Aspect 11: The method of any of aspects 9 through 10, further comprising: determining that the first wireless device has data for transmission to the second wireless device; and receiving the data multiplexed with the feedback information for the first CCA trigger in a same transmission burst from the first wireless device.

Aspect 12: The method of aspect 11, further comprising: selecting, based at least in part on the data, a first duration for the first CCA procedure, wherein the first duration is longer than a second duration for the second CCA procedure.

Aspect 13: The method of any of aspects 9 through 12, further comprising: determining, based at least in part on the first CCA procedure, a channel occupancy time for the data transmission.

Aspect 14: The method of any of aspects 9 through 13, further comprising: identifying a duration for a third CCA procedure for the first wireless device to perform before transmitting the feedback information for the CCA trigger; selecting a resource allocation for the first wireless device to use to transmit the feedback information for the CCA trigger based at least in part on the duration for the third CCA procedure; and transmitting the resource allocation to the first wireless device.

Aspect 15: The method of any of aspects 9 through 14, further comprising: determining that an interference level for a channel used for communicating with the first wireless device has a threshold rate of change, wherein the second CCA procedure is performed based at least in part on the threshold rate of change.

Aspect 16: The method of any of aspects 9 through 15, further comprising: determining that a gap period between receiving the feedback information for the CCA trigger and transmitting the data transmission satisfies a threshold, wherein the second CCA procedure is performed based at least in part on the gap period satisfying the threshold.

Aspect 17: An apparatus for wireless communication, comprising a processor; memory coupled with the processor; and instructions stored in the memory and executable by the processor to cause the apparatus to perform a method of any of aspects 1 through 8.

Aspect 18: An apparatus for wireless communication, comprising at least one means for performing a method of any of aspects 1 through 8.

Aspect 19: A non-transitory computer-readable medium storing code for wireless communication, the code comprising instructions executable by a processor to perform a method of any of aspects 1 through 8.

Aspect 20: An apparatus comprising a processor; memory coupled with the processor; and instructions stored in the memory and executable by the processor to cause the apparatus to perform a method of any of aspects 9 through 16.

Aspect 21: An apparatus comprising at least one means for performing a method of any of aspects 9 through 16.

Aspect 22: A non-transitory computer-readable medium storing code the code comprising instructions executable by a processor to perform a method of any of aspects 9 through 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a first wireless device, a clear channel assessment trigger from a second wireless device, the clear channel assessment trigger associated with a data transmission by the second wireless device;
transmitting, based at least in part on a result of a first clear channel assessment procedure, feedback information for the clear channel assessment trigger;
receiving the data transmission based at least in part on the feedback information for the first clear channel assessment procedure; and
transmitting, based at least in part on a result of a second clear channel assessment procedure, feedback information for the data transmission, wherein the first clear channel assessment procedure has a first duration that is longer than a second duration for the second clear channel assessment procedure.

2. The method of claim 1, wherein transmitting, based at least in part on the result of the first clear channel assessment procedure, feedback information for the clear channel assessment trigger comprises:
transmitting the feedback information if the first clear channel assessment procedure is successful.

3. The method of claim 1, further comprising:
determining that the first wireless device has data for transmission to the second wireless device; and
multiplexing the data and the feedback information for the first clear channel assessment trigger in a same transmission burst to the second wireless device.

4. The method of claim 1, further comprising:
determining, based at least in part on the clear channel assessment trigger, a channel occupancy time for the data transmission.

5. The method of claim 1, further comprising:
determining, based at least in part on the clear channel assessment trigger, a gap duration between receiving the data transmission and transmitting the feedback information for the data transmission; and
selecting the second duration for the second clear channel assessment procedure based at least in part on the gap duration.

6. The method of claim 1, further comprising:
determining the first duration for the first clear channel assessment procedure based on the clear channel assessment trigger.

7. The method of claim 1, further comprising:
receiving a resource allocation for transmitting the feedback information for the clear channel assessment trigger; and
determining the first duration of the first clear channel assessment procedure based on the resource allocation for transmitting the feedback information for the clear channel assessment trigger.

8. The method of claim 1, further comprising:
determining that a gap period between receiving the data transmission and transmitting the feedback information for the data transmission satisfies a threshold, wherein the second channel assessment procedure is performed based at least in part on the gap period satisfying the threshold.

9. A method for wireless communication:
transmitting, based at least in part on a result of a first clear channel assessment procedure, a clear channel assessment trigger to a first wireless device, the clear channel assessment trigger associated with a data transmission by a second wireless device;
receiving, from the first wireless device, feedback information for the clear channel assessment trigger;
transmitting, based at least in part on a result of a second clear channel assessment procedure and responsive to the feedback information for the clear channel assessment trigger, the data transmission to the first wireless device; and
receiving feedback information for the data transmission from the first wireless device.

10. The method of claim 9, wherein transmitting the clear channel assessment trigger comprises:
transmitting the clear channel assessment trigger to trigger the data transmission to the first wireless device if the first clear channel assessment procedure is successful.

11. The method of claim 9, further comprising:
determining that the first wireless device has data for transmission to the second wireless device; and
receiving the data multiplexed with the feedback information for the first clear channel assessment trigger in a same transmission burst from the first wireless device.

12. The method of claim 11, further comprising:
selecting, based at least in part on the data, a first duration for the first clear channel assessment procedure, wherein the first duration is longer than a second duration for the second clear channel assessment procedure.

13. The method of claim 9, further comprising:
determining, based at least in part on the first clear channel assessment procedure, a channel occupancy time for the data transmission.

14. The method of claim 9, further comprising:
identifying a duration for a third clear channel assessment procedure for the first wireless device to perform before transmitting the feedback information for the clear channel assessment trigger;
selecting a resource allocation for the first wireless device to use to transmit the feedback information for the clear channel assessment trigger based at least in part on the duration for the third clear channel assessment procedure; and
transmitting the resource allocation to the first wireless device.

15. An apparatus for wireless communication, comprising:
a processor,
a memory coupled with the processor, wherein the memory comprises instructions executable by the processor to cause the apparatus to:
receive, at a first wireless device, a clear channel assessment trigger from a second wireless device, the clear channel assessment trigger associated with a data transmission by the second wireless device;
transmit, based at least in part on a result of a first clear channel assessment procedure, feedback information for the clear channel assessment trigger;
receive the data transmission based at least in part on the feedback information for the first clear channel assessment procedure; and
transmit, based at least in part on a result of a second clear channel assessment procedure, feedback information for the data transmission, wherein the first clear channel assessment procedure has a first duration that is longer than a second duration for the second clear channel assessment procedure.

16. The apparatus of claim 15, wherein the instructions to transmitting, based at least in part on the result of the first clear channel assessment procedure, feedback information for the clear channel assessment trigger are executable by the processor to cause the apparatus to:
  transmit the feedback information if the first clear channel assessment procedure is successful.

17. The apparatus of claim 15, wherein the instructions are further executable by the processor to cause the apparatus to:
  determine that the first wireless device has data for transmission to the second wireless device; and
  multiplex the data and the feedback information for the first clear channel assessment trigger in a same transmission burst to the second wireless device.

18. The apparatus of claim 15, wherein the instructions are further executable by the processor to cause the apparatus to:
  determine, based at least in part on the clear channel assessment trigger, a channel occupancy time for the data transmission.

19. The apparatus of claim 15, wherein the instructions are further executable by the processor to cause the apparatus to:
  determine, based at least in part on the clear channel assessment trigger, a gap duration between receiving the data transmission and transmitting the feedback information for the data transmission; and
  select the second duration for the second clear channel assessment procedure based at least in part on the gap duration.

20. The apparatus of claim 15, wherein the instructions are further executable by the processor to cause the apparatus to:
  determine the first duration for the first clear channel assessment procedure based on the clear channel assessment trigger.

21. The apparatus of claim 15, wherein the instructions are further executable by the processor to cause the apparatus to:
  receive a resource allocation for transmitting the feedback information for the clear channel assessment trigger; and
  determine the first duration of the first clear channel assessment procedure based on the resource allocation for transmitting the feedback information for the clear channel assessment trigger.

22. The apparatus of claim 15, wherein the instructions are further executable by the processor to cause the apparatus to:
  determine that a gap period between receiving the data transmission and transmitting the feedback information for the data transmission satisfies a threshold, wherein the second channel assessment procedure is performed based at least in part on the gap period satisfying the threshold.

23. An apparatus for wireless communication, comprising:
  a processor,
  a memory coupled with the processor, wherein the memory comprises instructions executable by the processor to cause the apparatus to:
    transmit, based at least in part on a result of a first clear channel assessment procedure, a clear channel assessment trigger to a first wireless device, the clear channel assessment trigger associated with a data transmission by a second wireless device;
    receive, from the first wireless device, feedback information for the clear channel assessment trigger;
    transmit, based at least in part on a result of a second clear channel assessment procedure and responsive to the feedback information for the clear channel assessment trigger, the data transmission to the first wireless device; and
    receive feedback information for the data transmission from the first wireless device.

24. The apparatus of claim 23, wherein the instructions to transmit the clear channel assessment trigger are executable by the processor to cause the apparatus to:
  transmit the clear channel assessment trigger to trigger the data transmission to the first wireless device if the first clear channel assessment procedure is successful.

25. The apparatus of claim 23, wherein the instructions are further executable by the processor to cause the apparatus to:
  determine that the first wireless device has data for transmission to the second wireless device; and
  receive the data multiplexed with the feedback information for the first clear channel assessment trigger in a same transmission burst from the first wireless device.

26. The apparatus of claim 25, wherein the instructions are further executable by the processor to cause the apparatus to:
  select, based at least in part on the data, a first duration for the first clear channel assessment procedure, wherein the first duration is longer than a second duration for the second clear channel assessment procedure.

27. The apparatus of claim 23, wherein the instructions are further executable by the processor to cause the apparatus to:
  determine, based at least in part on the first clear channel assessment procedure, a channel occupancy time for the data transmission.

28. The apparatus of claim 23, wherein the instructions are further executable by the processor to cause the apparatus to:
  identify a duration for a third clear channel assessment procedure for the first wireless device to perform before transmitting the feedback information for the clear channel assessment trigger;
  select a resource allocation for the first wireless device to use to transmit the feedback information for the clear channel assessment trigger based at least in part on the duration for the third clear channel assessment procedure; and
  transmit the resource allocation to the first wireless device.

29. The apparatus of claim 23, wherein the instructions are further executable by the processor to cause the apparatus to:
  determine that an interference level for a channel used for communicating with the first wireless device has a threshold rate of change, wherein the second clear channel assessment procedure is performed based at least in part on the threshold rate of change.

30. The apparatus of claim 23, wherein the instructions are further executable by the processor to cause the apparatus to:
  determine that a gap period between receiving the feedback information for the clear channel assessment trigger and transmitting the data transmission satisfies a threshold, wherein the second clear channel assessment procedure is performed based at least in part on the gap period satisfying the threshold.

* * * * *